United States Patent [19]
Asanuma et al.

[11] Patent Number: 5,735,119
[45] Date of Patent: Apr. 7, 1998

[54] EXHAUST PURIFICATION DEVICE OF AN ENGINE

[75] Inventors: Takamitsu Asanuma; Tetsuro Kihara, both of Susono; Kenji Katoh, Shizuoka; Satoshi Iguchi, Mishima, all of Japan

[73] Assignee: Toyota Jidosha Kabushiki Kaisha, Aichi, Japan

[21] Appl. No.: 620,623

[22] Filed: Mar. 22, 1996

[30] Foreign Application Priority Data

Mar. 24, 1995 [JP] Japan ................... 7-066004

[51] Int. Cl.$^6$ .................................. F01N 3/20
[52] U.S. Cl. ................. 60/276; 60/285; 60/297; 60/301
[58] Field of Search ............... 60/276, 285, 297, 60/301, 311

[56] References Cited

U.S. PATENT DOCUMENTS 5,437,153 8/1995 Takeshima et al. ................... 60/276
5,473,887 12/1995 Takeshima et al. ................... 60/276
5,483,795 1/1996 Katoh et al. ......................... 60/276
5,577,382 11/1996 Kihara et al. ........................ 60/276

FOREIGN PATENT DOCUMENTS 5-106494  4/1993  Japan.
6-200737  7/1994  Japan.
6-272546  9/1994  Japan.

*Primary Examiner*—Tony M. Argenbright
*Attorney, Agent, or Firm*—Kenyon & Kenyon

[57] ABSTRACT

An exhaust gas purification device of an engine providing a $NO_x$ absorbent arranged in the exhaust passage. An $O_2$ sensor is arranged in the engine exhaust passage downstream of the $NO_x$ absorbent. The degree of deterioration of the $NO_x$ absorbent is detected from the output signal of the $O_2$ sensor. The cycle for making the air-fuel ratio of the air-fuel mixture rich for causing the release of the $NO_x$ from the $NO_x$ absorbent and the rich time at that time are shortened the greater the deterioration of the $NO_x$ absorbent.

23 Claims, 21 Drawing Sheets

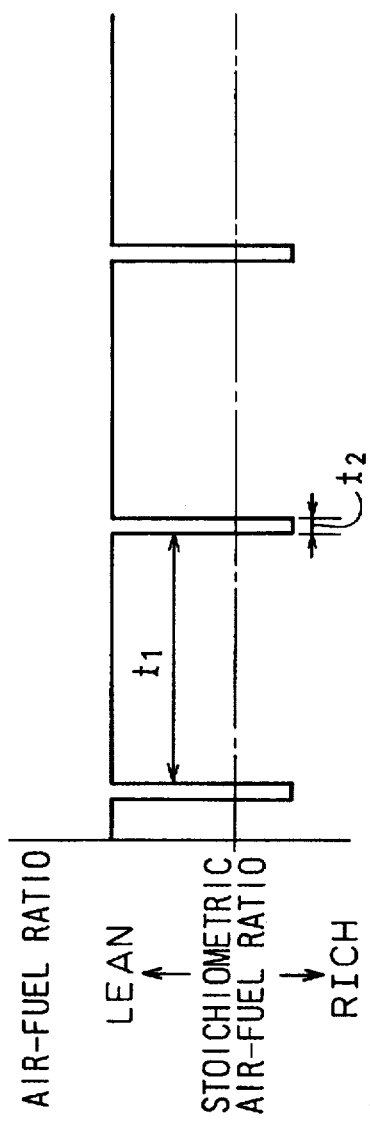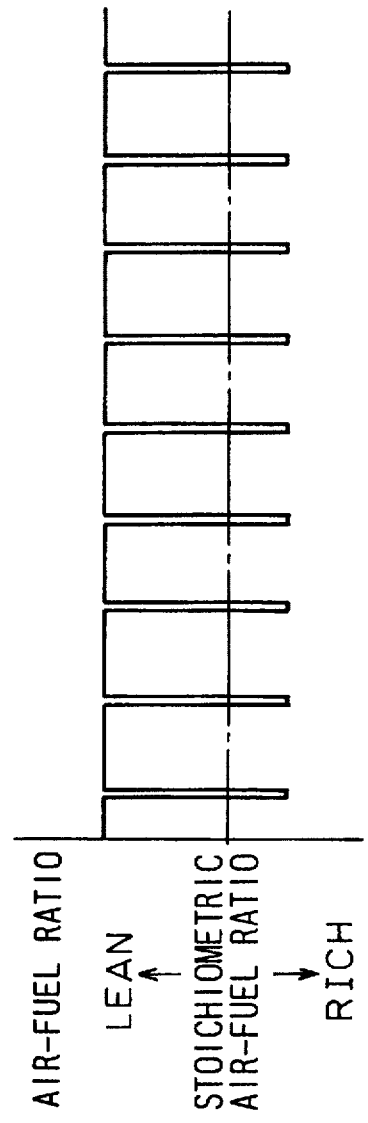

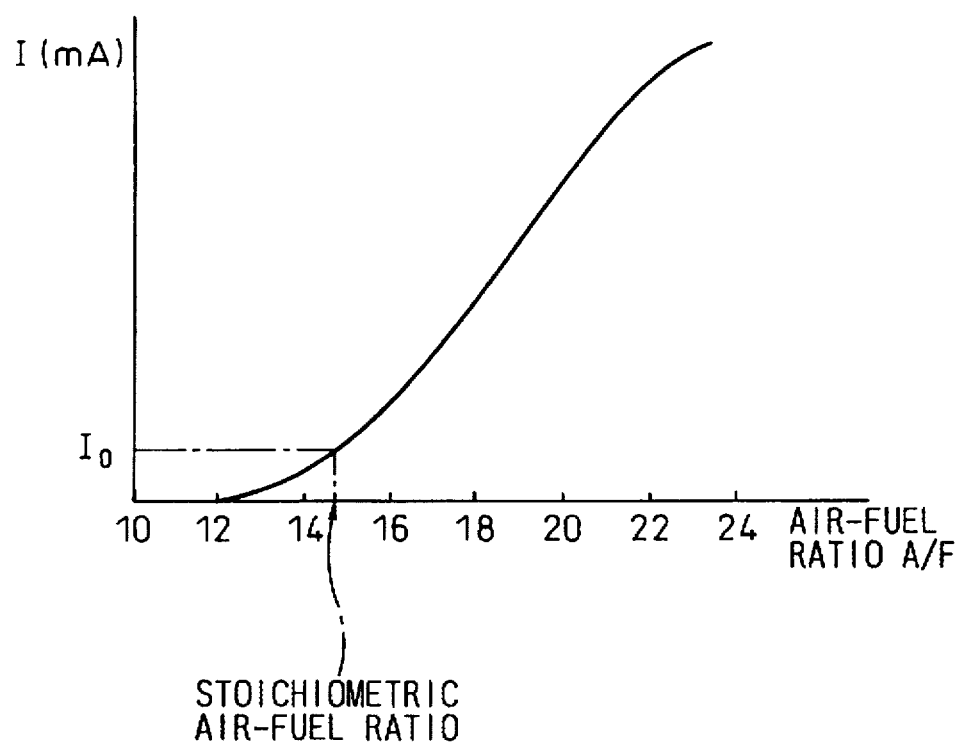

EXHAUST PURIFICATION DEVICE OF AN ENGINE

BACKGROUND OF THE INVENTION

1. Field of the Invention

The present invention relates to an exhaust purification device of an engine.

2. Description of the Related Art

Known in the art is an internal combustion engine which provides in the engine exhaust passage an $NO_x$ absorbent which absorbs $NO_x$ when the air-fuel ratio of the inflowing exhaust gas is lean and releases the absorbed $NO_x$ when the air-fuel ratio of the inflowing exhaust gas becomes rich and repeatedly temporarily changes the air-fuel ratio of the exhaust gas flowing into the $NO_x$ absorbent from lean to rich at certain time intervals so as to cause the $NO_x$ absorbed in the $NO_x$ absorbent to be released and reduced (see PCT International Publication WO93/07363).

This type of $NO_x$ absorbent, however, gradually deteriorates along with use. The more it deteriorates, the lower the ability of the $NO_x$ absorbent to absorb $NO_x$. If the ability of the $NO_x$ to absorb $NO_x$ falls, then it will become necessary to release $NO_x$ from the $NO_x$ absorbent while the amount of $NO_x$ absorbed in the $NO_x$ absorbent is still small, so the more deteriorated the $NO_x$ absorbent, the shorter the cycle for changing the air-fuel ratio of the exhaust gas flowing into the $NO_x$ absorbent to rich must be made. In the above-mentioned internal combustion engine, however, no consideration is given at all to the deterioration of the $NO_x$ absorbent. The air-fuel ratio of the exhaust gas flowing into the $NO_x$ absorbent is changed from lean to rich at a predetermined cycle suited to a new $NO_x$ absorbent regardless of the degree of deterioration of the $NO_x$ absorbent. Accordingly, when the degree of deterioration of the $NO_x$ absorbent is high, the ability of the $NO_x$ absorbent to absorb the $NO_x$ will become saturated before the air-flow ratio of the exhaust gas flowing into the $NO_x$ absorbent is changed to rich and accordingly the $NO_x$ will end up being released into the atmosphere without being absorbed by the $NO_x$ absorbent.

Further, when the $NO_x$ absorbent deteriorates, the amount of the $NO_x$ absorbed in the $NO_x$ absorbent becomes smaller and accordingly it is necessary to shorten the time the air-fuel ratio of the exhaust gas flowing into the $NO_x$ absorbent is made rich for releasing the total $NO_x$ absorbed in the $NO_x$ absorbent. In the above-mentioned internal combustion engine, however, this rich period is made a constant period suited to a new $NO_x$ absorbent without regard as to the deterioration of the $NO_x$ absorbent. Accordingly, when the degree of deterioration of the $NO_x$ absorbent becomes high, the air-fuel ratio of the exhaust gas flowing into the $NO_x$ absorbent continues to be made rich even after all of the $NO_x$ is released from the $NO_x$ absorbent and therefore not only is the fuel consumption increased, but also a large amount of unburnt hydrocarbons is released into the atmosphere.

SUMMARY OF THE INVENTION

An object of the present invention is to provide an exhaust gas purification device capable of preventing $NO_x$ and hydrocarbons from being discharged into the atmosphere and also preventing the fuel consumption from increasing.

According to the present invention, there is provided an exhaust purification device of an engine having an exhaust passage, comprising an $NO_x$ absorbent arranged in the exhaust passage, the $NO_x$ absorbent absorbing $NO_x$ therein when an air-fuel ratio of exhaust gas flowing into the $NO_x$ absorbent is lean and releasing absorbed $NO_x$ therefrom when the air-fuel ratio of the exhaust gas flowing into the $NO_x$ absorbent becomes rich; an air-fuel ratio control means for controlling the air-fuel ratio of the exhaust gas flowing into the $NO_x$ absorbent to temporarily change the air-fuel ratio of the exhaust gas flowing into the $NO_x$ absorbent from lean to rich at certain time intervals to release $NO_x$ from the $NO_x$ absorbent; a deterioration detecting means for detecting a degree of deterioration of the $NO_x$ absorbent; and a $NO_x$ releasing control means for controlling at least one of a period at which the air-fuel ratio of exhaust gas flowing into the $NO_x$ absorbent is changed from lean to rich and a rich time during which the air-fuel ratio of exhaust gas flowing into the $NO_x$ absorbent is made rich to make one of the period and the rich time shorter as the degree of deterioration of the $NO_x$ becomes higher.

BRIEF DESCRIPTION OF THE DRAWINGS

The present invention may be more fully understood from the description of the preferred embodiments of the invention set forth below with reference to the accompanying drawings, wherein:

FIGS. 8A and 8B are views of a cycle of making the air-fuel ratio of an air-fuel mixture rich for releasing $NO_x$ and a rich time at this time;

FIG. 9 is a view of a current flowing between an anode and a cathode of an $O_2$ sensor;

DESCRIPTION OF THE PREFERRED EMBODIMENTS

Figure 1:
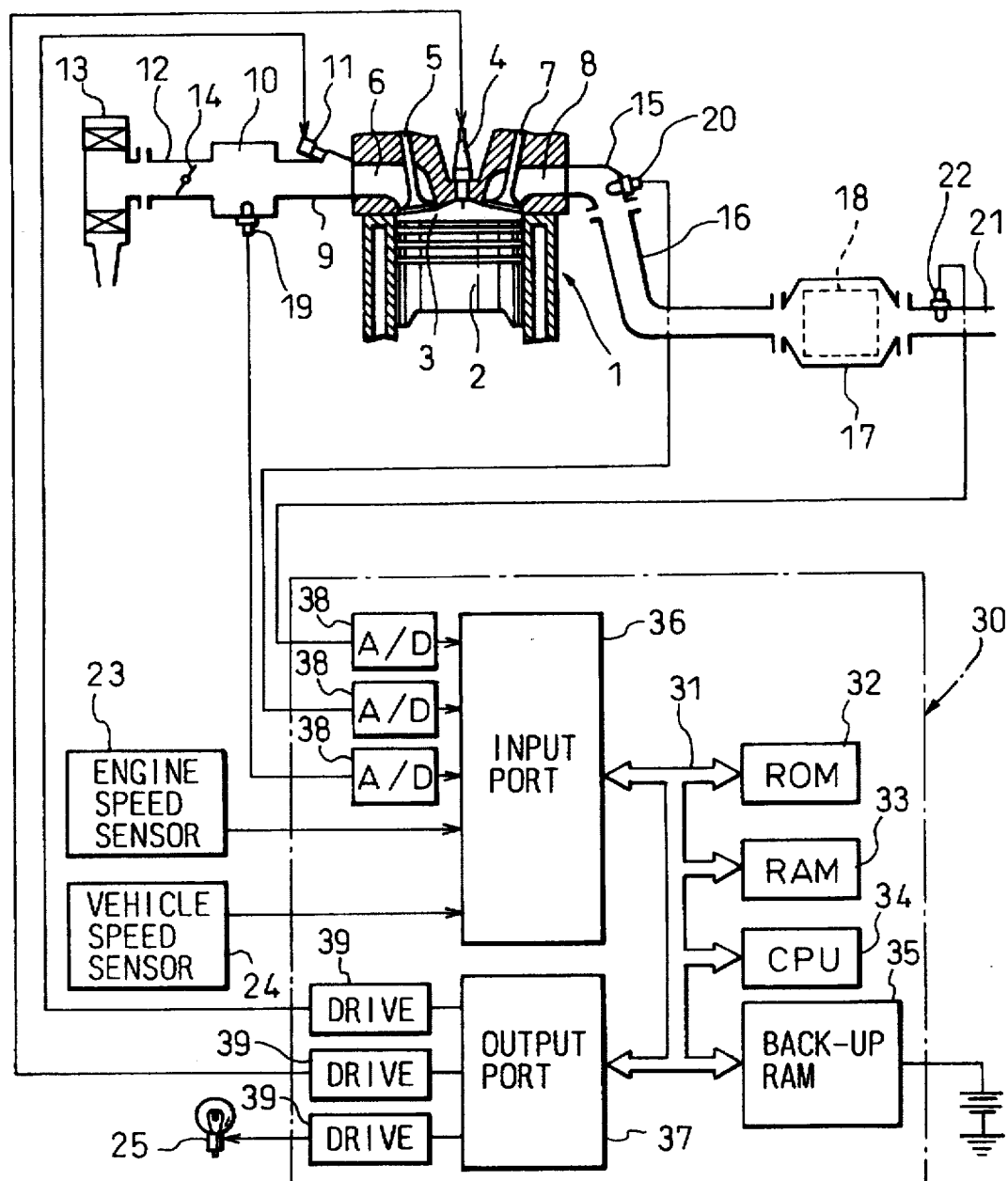
FIG. 1 is an overall view of an engine.

Referring to FIG. 1, 1 denotes an engine body, 2, a piston, 3, a combustion chamber, 4, a spark plug, 5, an intake valve, 6, an intake port, 7, an exhaust valve, and 8, an exhaust port. The intake port 6 is connected to a surge tank 10 via a corresponding branch pipe 9, and a fuel injector 11 injecting fuel toward the interior of the input port 6 is attached to each branch pipe 9. The surge tank 10 is connected via an intake duct 12 to an air cleaner 13, and a throttle valve 14 is arranged in the intake duct 12. On the other hand, the exhaust port 8 is connected via an exhaust manifold 15 and an exhaust pipe 16 to a casing 17 containing a $NO_x$ absorbent 18.

An electronic control unit 30 comprises a digital computer and is provided with a read only memory (ROM) 32, a random access memory (RAM) 33, a microprocessor (CPU) 34, a back-up RAM 35 continuously connected to a power source, an input port 36, and an exhaust port 37 all of which are connected to each other by a bi-directional bus 31. In the surge tank 10, a pressure sensor 19 for generating an output voltage proportional to an absolute pressure in the surge tank 10 is arranged. The output voltage of this pressure sensor 19 is input to the input port 36 via a corresponding analog-to-digital (AD) converter 38. An air-fuel ratio sensor (hereinafter referred to as an $O_2$ sensor) 20 is arranged in the exhaust manifold 15, and the output of this $O_2$ sensor 20 is input to the input port 36 via the corresponding AD converter 38. Another air-fuel ratio sensor (hereinafter referred to as an $O_2$ sensor) 22 is arranged in the exhaust pipe 21 downstream of the $NO_x$ absorbent 18. This $O_2$ sensor 22 is connected to the input port 36 via a corresponding AD converter 38. Further, an engine speed sensor 23 generating an output pulse representing the engine speed and a vehicle speed sensor 24 generating an output pulse representing the vehicle speed are connected to the input port 36. On the other hand, the output port 37 is connected via the corresponding drive circuit 39 to the spark plug 4, fuel injection valve 11, and the alarm lamp 25.

In the engine shown in FIG. 1, a fuel injection time TAU is calculated on the basis of for example the following equation:

$$TAU = TP \cdot K \cdot FAF$$

Figure 2:
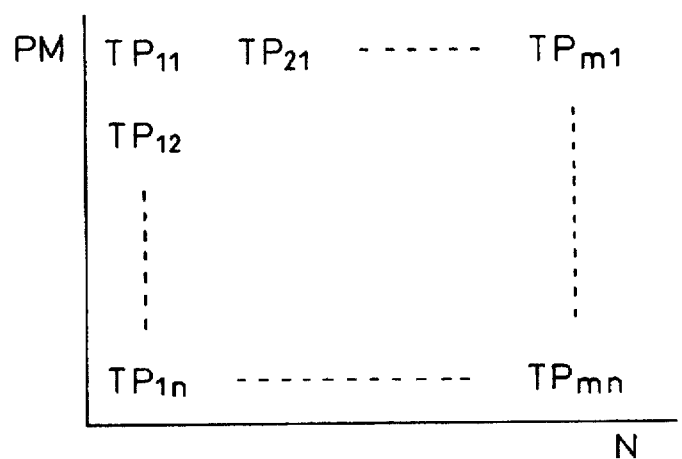
FIG. 2 is a view of a map of a basic fuel injection time.

Here, TP represents a basic fuel injection time, K, a correction coefficient, and FAF, a feedback correction coefficient, respectively. The basic fuel injection time TP indicates a fuel injection time necessary for making the air-fuel ratio of the air-fuel mixture to be supplied into the engine cylinder the stoichiometric air-fuel ratio. This basic fuel injection time TP is found in advance by experiments and preliminarily stored in the ROM 32 in the form of a map as shown in FIG. 2 as a function of the absolute pressure PM in the surge tank 10 and the engine rotation speed N. The correction coefficient K is a coefficient for controlling the air-fuel ratio of the air-fuel mixture to be supplied into the engine cylinder. If K=1.0, the air-fuel ratio of the air-fuel mixture to be supplied into the engine cylinder becomes the stoichiometric air-fuel ratio. Contrary to this, when K becomes smaller than 1.0, the air-fuel ratio of the air-fuel mixture to be supplied into the engine cylinder becomes larger than the stoichiometric air-fuel ratio, that is, lean, and when K becomes larger than 1.0, the air-fuel ratio of the air-fuel mixture supplied into the engine cylinder becomes smaller than the stoichiometric air-fuel ratio, that is, rich.

The feedback correction coefficient FAF is a coefficient for making the air-fuel ratio accurately coincide with the stoichiometric air-fuel ratio on the basis of the output signal of the $O_2$ sensor 20 when K=1.0, that is, when the air-fuel ratio of the air-fuel mixture supplied into the engine cylinder should be made the stoichiometric air-fuel ratio. This feedback correction coefficient FAF moves up or down around about 1.0. The FAF is decreased when the air-fuel mixture becomes rich and increased when the air-fuel mixture becomes lean. Note that, when K<1.0 or K>1.0, the FAF is fixed to 1.0.

Figure 3:
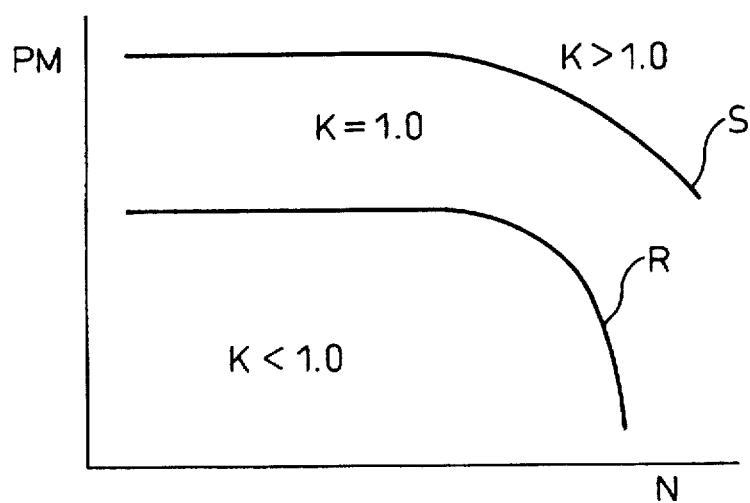
FIG. 3 is a view of a correction coefficient K.

The target air-fuel ratio of the air-fuel mixture which should be supplied into the engine cylinder, that is, the value of the correction coefficient K, is changed in accordance with the operating state of the engine. In the embodiment according to the present invention, basically, as shown in FIG. 3, it is determined in advance as a function of the absolute pressure PM in the surge tank 10 and the engine speed N. Namely, as shown in FIG. 3, in a low load operation region on the lower load side from a solid line R, K becomes smaller than 1.0, that is, the air-fuel ratio of the air-fuel mixture is made lean, and in a high load operation region between the solid line R and solid line S, K becomes equal to 1.0, that is, the air-fuel ratio of the air-fuel mixture is made the stoichiometric air-fuel ratio. In the full load operation region on the higher load side from the solid line S, K becomes larger than 1.0, that is, the air-fuel ratio of the air-fuel mixture is made rich.

Figure 4:
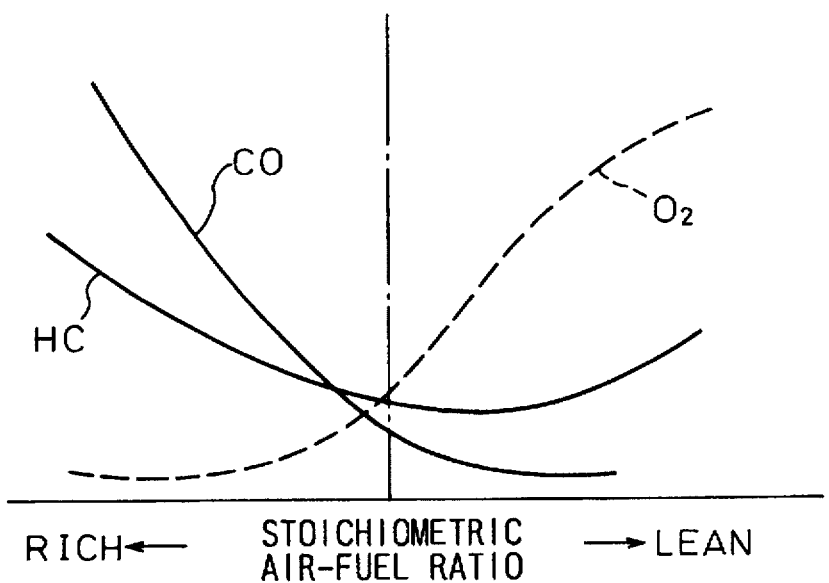
FIG. 4 is a graph schematically showing a concentration of unburnt HC and CO and oxygen in exhaust gas discharged from the engine.

FIG. 4 schematically shows the concentration of representative components in the exhaust gas discharged from the combustion chamber 3. As seen from FIG. 4, the concentration of the unburnt HC and CO in the exhaust gas discharged from the combustion chamber 3 is increased as the air-fuel ratio of the air-fuel mixture supplied into the combustion chamber 3 becomes rich, and the concentration of the oxygen $O_2$ discharged from the combustion chamber 3 is increased as the air-fuel ratio of the air-fuel mixture supplied into the combustion chamber 3 becomes lean.

A $NO_x$ absorbent 18 accommodated in the casing 17 uses for example alumina as the carrier. On this carrier, at least one element selected from alkali metals such as for example potassium K, sodium Na, lithium Li, and cesium Cs, alkali earth metals such as barium Ba or calcium Ca, and rare earth metals such as lanthanum La or yttrium Y and a precious metal such as platinum Pt are carried. When the ratio of the air and fuel (hydrocarbon) supplied into the engine intake passage and the exhaust passage upstream of the $NO_x$ absorbent 18 is referred to as the air-fuel ratio of the inflowing exhaust gas into the $NO_x$ absorbent 18, this $NO_x$ absorbent 18 performs the action of absorbing and releasing $NO_x$ so as to absorb the $NO_n$ when the air-fuel ratio of the inflowing exhaust gas is lean and release the absorbed $NO_x$ when the oxygen concentration in the inflowing exhaust gas is lowered. Note that, where the fuel (hydrocarbon) or the air is not supplied into the exhaust passage upstream of the $NO_x$ absorbent 18, the air-fuel ratio of the flowing exhaust gas coincides with the air-fuel ratio of the air-fuel mixture supplied into the combustion chamber 3, and therefore, in this case, the $NO_x$ absorbent 18 absorbs the $NO_x$ when the air-fuel ratio of the air-fuel mixture supplied into the combustion chamber 3 is lean and releases the absorbed $NO_x$ when the oxygen concentration in the air-fuel mixture supplied into the combustion chamber 3 is lowered.

Figure 5A:
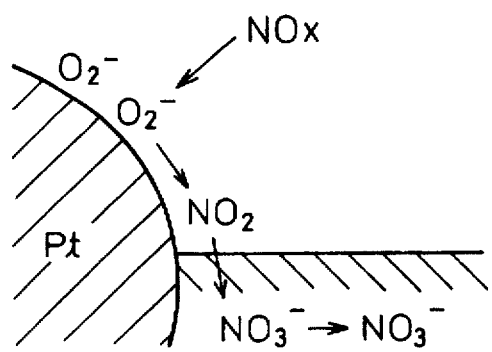
FIGS. 5A and 5B are views for explaining an absorption and releasing action of $NO_x$.
Figure 5B:
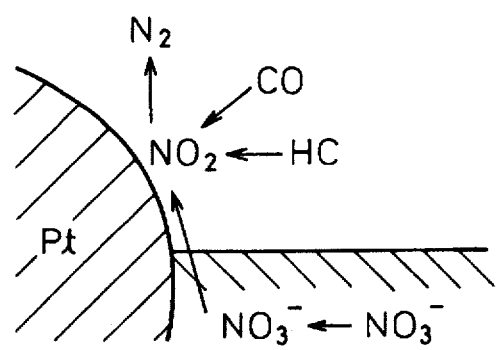

When the $NO_x$ absorbent 18 is arranged in the engine exhaust passage, this $NO_x$ absorbent 18 actually performs the absorbing and releasing action of $NO_x$, but there are areas of uncertainty regarding the detailed mechanism of this absorbing and releasing action. However, it can be considered that this absorbing and releasing action is carried out by the mechanism as shown in FIGS. 5A and 5B. Next, an explanation will be made of this mechanism by taking as an example a case where platinum Pt and barium Ba are carried on this carrier, but a similar mechanism is obtained even if an other precious metal or alkali metal, alkali earth metal, and rare earth metal are used.

Namely, when the inflowing exhaust gas becomes considerably lean, the oxygen concentration in the inflowing exhaust gas is greatly increased, and as shown in FIG. 5A, the oxygen $O_2$ is deposited on the surface of the platinum Pt in the form of $O_2^-$ or $O^{2-}$. On the other hand, the NO in the inflowing exhaust gas reacts with $O_2^-$ or $O^{2-}$ on the surface of the platinum Pt and becomes $NO_2$ ($2NO+O_2 \rightarrow 2NO_2$). Subsequently, one part of the generated $NO_2$ is absorbed into the absorbent while being oxidized on the platinum Pt and bonded to the barium oxide BaO while being diffused in the absorbent in the form of a nitric acid ion $NO_3^-$ as shown in FIG. 5A. In this way, $NO_x$ is absorbed into the $NO_x$ absorbent 18.

So far as the oxygen concentration in the inflowing exhaust gas is high, $NO_2$ is generated on the surface of the platinum Pt, and so far as the $NO_x$ absorbing capability of the absorbent is not saturated, the nitric acid ion $NO_3^-$ formed by absorption of $NO_2$ into the absorbent is generated. Contrary to this, when the oxygen concentration in the flowing exhaust gas is lowered and the amount of generation of the $NO_2$ is lowered, the reaction advances in a reverse direction ($NO_3^- \rightarrow NO_2$), and thus the nitric acid ion $NO_3^-$ in the absorbent is released from the absorbent in the form of $NO_2$. Namely, when the oxygen concentration in the flowing exhaust gas is lowered, $NO_x$ will be released from the $NO_x$ absorbent 18. As shown in FIG. 4, when the degree of leanness of the inflowing exhaust gas becomes low, the oxygen concentration in the inflowing exhaust gas is lowered, and therefore when the degree of the leanness of the inflowing exhaust gas is lowered, even if the air-fuel ratio of the inflowing exhaust gas is lean, $NO_x$ will be released from the $NO_x$ absorbent 18.

On the other hand, when the air-fuel ratio of the air-fuel mixture supplied into the combustion chamber 3 is made rich and the air-fuel ratio of the inflowing exhaust gas becomes rich, as shown in FIG. 4, a large amount of unburnt HC and CO are discharged from the engine. These unburnt HC and CO react with the oxygen $O_2^-$ or $O^{2-}$ on the platinum Pt and are oxidized. Further, when the air-fuel ratio of the inflowing exhaust gas becomes rich, the oxygen concentration in the inflowing exhaust gas is extremely lowered, so $NO_2$ is released from the absorbent. This $NO_2$ reacts with the unburnt HC and CO and is reduced as shown in FIG. 5B. In this way, when $NO_2$ no longer exists on the surface of the platinum Pt, the $NO_2$ is successively released from the absorbent. Accordingly, when the air-fuel ratio of the inflowing exhaust gas is made rich, the $NO_x$ will be released from the $NO_x$ absorbent 18 in a short time.

Namely, when the air-fuel ratio of the inflowing exhaust gas is made rich, first of all, the unburnt HC and CO immediately react with $O_2^-$ or $O^{2-}$ on the platinum Pt and are oxidized, and then even if the $O_2^-$ or $O^{2-}$ on the platinum Pt is consumed, if the unburnt HC and CO still remain, the $NO_x$ released from the absorbent and the $NO_x$ discharged from the engine are reduced. Accordingly, if the air-fuel ratio of the inflowing exhaust gas is made rich, the $NO_x$ absorbed in the $NO_x$ absorbent 18 is released in a short time, and, in addition, this released $NO_x$ is reduced, so it becomes possible to prevent the $NO_x$ from being discharged into the atmosphere.

As mentioned above, when the lean air-fuel mixture is burned, $NO_x$ is absorbed into the $NO_x$ absorbent 18. However, there is a limit to the $NO_x$ absorbing ability of the $NO_x$ absorbent 18. When the $NO_x$ absorbing capability of the $NO_x$ absorbent 18 is saturated, the $NO_x$ absorbent 18 no longer can absorb the $NO_x$. Accordingly, it is necessary to release the $NO_x$ from the $NO_x$ absorbent 18 before the $NO_x$ absorbing capability of the $NO_x$ absorbent 18 is saturated. For this purpose, it is necessary to estimate to what degree the $NO_x$ has been absorbed in the $NO_x$ absorbent 18. Next, an explanation will be made of the estimation method of this amount of absorption of $NO_x$.

Figure 6:
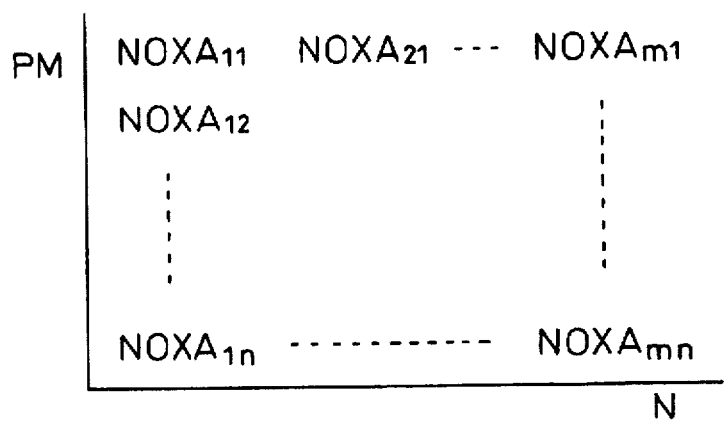
FIG. 6 is a view of an amount of absorption of $NO_x$ NOXA.

When the lean air-fuel mixture is burned, the higher the engine load, the larger the amount of $NO_x$ discharged from the engine per unit time, so the amount of $NO_x$ absorbed into the $NO_x$ absorbent 18 per unit time is increased. Also, the higher the engine speed, the larger the amount of $NO_x$ discharged from the engine per unit time, so the amount of $NO_x$ absorbed into the $NO_x$ absorbent 18 per unit time is increased. Accordingly, the amount of $NO_x$ absorbed into the $NO_x$ absorbent 18 per unit time becomes a function of the engine load and the engine speed. In this case, the engine load can be represented by the absolute pressure in the surge tank 10, so the amount of $NO_x$ absorbed into the $NO_x$ absorbent 18 per unit time becomes a function of the absolute pressure PM in the surge tank 10 and the engine speed N. Accordingly, in the embodiment according to the present invention, the amount of $NO_x$ absorbed into the $NO_x$ absorbent 18 per unit time is found in advance as a function of the absolute pressure PM and the engine speed N by experiments. These amounts of absorption of $NO_x$, NOXA and PM are stored in advance in the ROM 32 in the form of a map shown in FIG. 6 as a function of PM and N.

On the other hand, as mentioned before, during the period where the $NO_x$ is released from the $NO_x$ absorbent 18, the unburnt HC and CO contained in the exhaust gas, that is, the excess fuel, is used for reducing the $NO_x$ released from the $NO_x$ absorbent 18, therefore the amount NOXD of $NO_x$ released from the $NO_x$ absorbent 18 per unit time becomes proportional to the amount of excess fuel supplied per unit time. Note that the amount $Q_{ex}$ of excess fuel supplied per unit time can be represented by the following equation:

$$Q_{ex} = f_1 \cdot (K-1.0) \cdot TP \cdot N$$

Here, $f_1$ indicates a proportional constant, K, a correction coefficient, TP a basic fuel injection time, and N, an engine speed. On the other hand, when the proportional constant is $f_2$, the amount NOXD of $NO_x$ released from the $NO_x$ absorbent 18 per unit time can be represented by $$NOXD = f_2 \cdot Q_{ex}$$

so if $f = f_1 \cdot f_2$, the amount NOXD of $NO_x$ released from the $NO_x$ absorbent 18 per unit time can be represented by the following equation:

$$NOXD = f \cdot (K-1.0) \cdot TP \cdot N$$

As mentioned above, when a lean air-fuel mixture is burned, the amount of absorption of $NO_x$ per unit time is represented by NOXD, and when a rich air-fuel mixture is burned, the amount of release of $NO_x$ per unit time is represented by NOXD, therefore the amount $\Sigma NOX$ of $NO_x$ estimated to be absorbed in the $NO_x$ absorbent 18 will be represented by the following equation:

$$\Sigma NOX = \Sigma NOX + NOXA - NOXD$$

Figure 7:
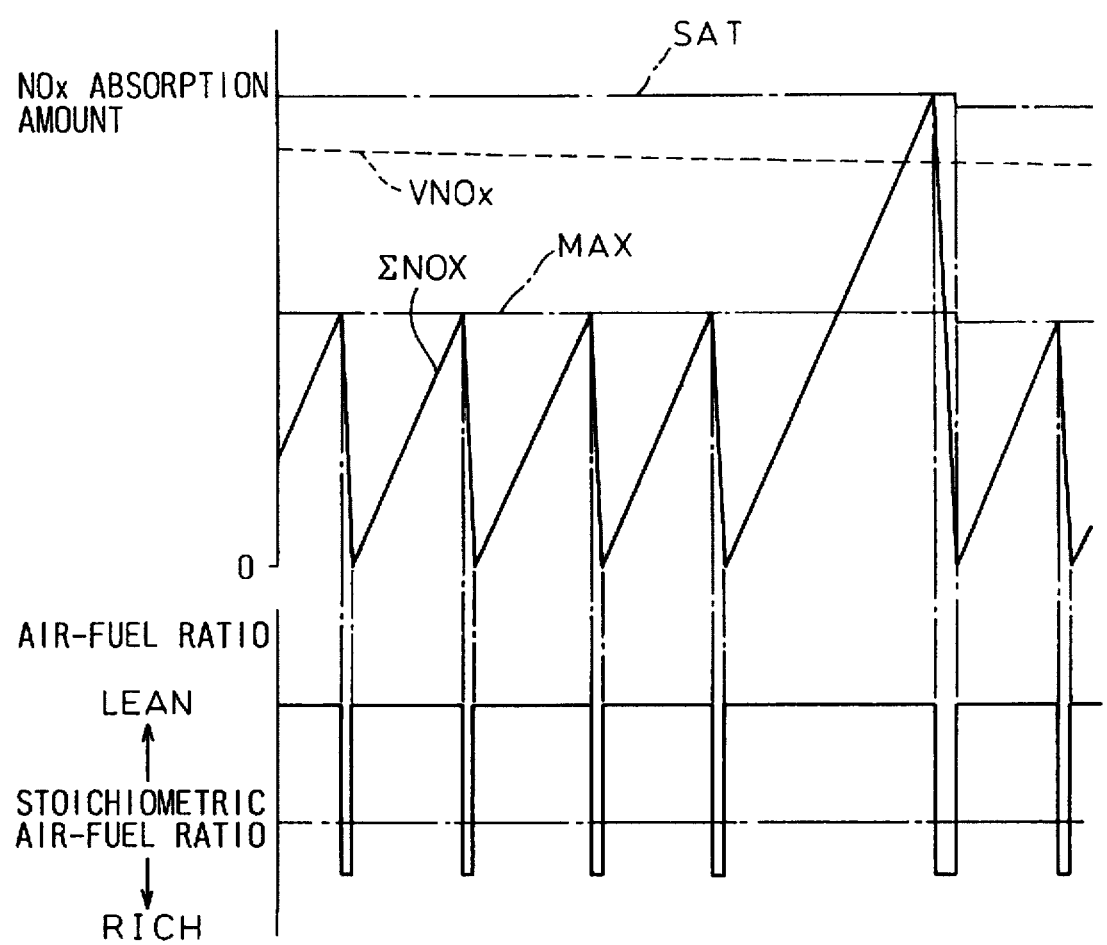
FIG. 7 is a time chart of the air-fuel ratio control.

Therefore, in the embodiment according to the present invention, as shown in FIG. 7, when the amount $\Sigma NOX$ of the $NO_x$ estimated to be absorbed in the $NO_x$ absorbent 18, in practice, the corrected amount of estimation of $NO_x$ ΣNKX mentioned later, reaches the allowable maximum value MAX, the air-fuel ratio of the air-fuel mixture is temporarily made rich, whereby $NO_x$ is released from the $NO_x$ absorbent 18.

However, $SO_x$ is contained in the exhaust gas, and not only $NO_x$, but also $SO_x$ are absorbed into the $NO_x$ absorbent 18. The absorbing mechanism of $SO_x$ to the $NO_x$ absorbent 18 can be considered to be the same as the absorption mechanism of $NO_x$.

Namely, similar to the explanation of the absorbing mechanism of $NO_x$, when the explanation is made by taking as an example a case where platinum Pt and barium Ba are carried on the carrier, as mentioned before, when the air-fuel ratio of the inflowing exhaust gas is lean, the oxygen $O_2$ is deposited on the surface of the platinum Pt in the form of $O_2^-$ or $O^{2-}$, and the $SO_2$ in the inflowing exhaust gas reacts with the $O_2^-$ or $O^{2-}$ on the surface of the platinum Pt and becomes $SO_3$. Subsequently, one part of the generated $SO_3$ is absorbed into the absorbent while being further oxidized on the platinum Pt and bonded to the barium oxide BaO while being diffused in the absorbent in the form of a sulfuric acid ion $SO_4^{2-}$ and stable sulfate $BaSO_4$ is generated.

However, this sulfate $BaSO_4$ is stable and hard to decompose. Even if the air-fuel ratio of the air-fuel mixture is made rich for just a short time as shown in FIG. 7, most of the sulfate $BaSO_4$ is not decomposed and remains as it is. Accordingly, the sulfate $BaSO_4$ is increased in the $NO_x$ absorbent 18 along with the elapse of time, and thus the maximum amount of absorption of $NO_x$ which can be absorbed by the $NO_x$ absorbent 18 will be gradually lowered along with the elapse of time. Namely, in other words, the $NO_x$ absorbent 18 will gradually deteriorate along with the elapse of time. When the maximum amount of absorption of $NO_x$ by the $NO_x$ absorbent 18 is lowered, it is necessary to release the $NO_x$ from the $NO_x$ absorbent 18 in a period when the amount of absorption of the $NO_x$ in the $NO_x$ absorbent 18 is small. For this purpose, first, it becomes necessary to correctly detect the maximum amount of absorption of $NO_x$ possible by the $NO_x$ absorbent 18, that is, the degree of deterioration of the $NO_x$ absorbent 18.

In the embodiment according to the present invention, the maximum amount of absorption of $NO_x$ possible by the $NO_x$ absorbent 18, that is, the degree of deterioration of the $NO_x$ absorbent 18, is detected from the air-fuel ratio detected by the $O_2$ sensor 22. This will be explained later.

Namely, when the air-fuel ratio of the air-fuel mixture supplied into the combustion chamber 3 becomes rich, as shown in FIG. 4, the exhaust gas containing the oxygen $O_2$ and the unburnt HC and CO is discharged from the combustion chamber 3, but this oxygen $O_2$ and the unburnt HC and CO do not react much at all with each other, and thus this oxygen $O_2$ passes through the $NO_x$ absorbent 18 and is discharged from the $NO_x$ absorbent 18. On the other hand, when the air-fuel ratio of the air-fuel mixture supplied into the combustion chamber 3 becomes rich, $NO_x$ is released from the $NO_x$ absorbent 18. At this time, the unburnt HC and CO contained in the exhaust gas is used for reducing the released $NO_x$, so during a period when the $NO_x$ is released from the $NO_x$ absorbent 18, no unburnt HC and CO are discharged from the $NO_x$ absorbent 18. Accordingly, during a period when the $NO_x$ is continuously released from the $NO_x$ absorbent 18, the oxygen $O_2$ is contained in the exhaust gas discharged from the $NO_x$ absorbent 18, but no unburnt HC and CO are contained, therefore during this term, the air-fuel ratio of the exhaust gas discharged from the $NO_x$ absorbent 18 becomes slightly lean.

Subsequently, when all of the $NO_x$ absorbed in the $NO_x$ absorbent 18 is released, the unburnt HC and CO contained in the exhaust gas are not used for the reduction of the $O_2$ in the $NO_x$ absorbent 18 but are discharged as they are from the $NO_x$ absorbent 18. Accordingly, the air-fuel ratio of the exhaust gas discharged from the $NO_x$ absorbent 18 becomes rich at this time. Namely, when all of the $NO_x$ absorbed in the $NO_x$ absorbent 18 is released, the air-fuel ratio of the exhaust gas discharged from the $NO_x$ absorbent 18 changes from lean to rich. Accordingly, all of the $NO_x$ absorbed in the $NO_x$ absorbent 18 is released from the $NO_x$ absorbent 18 during the time elapsing from when the air-fuel ratio of the exhaust gas flowing into the $NO_x$ absorbent 18 is changed from lean to rich to when the air-fuel ratio of the exhaust gas discharged from the $NO_x$ absorbent 18 becomes rich. Therefore, from this, the amount of $NO_x$ absorbed in the $NO_x$ absorbent 18 is seen. This will be explained in slightly detail more next.

The $O_2$ sensor 22 shown in FIG. 1 comprises a cup-like cylindrical body made of zirconia arranged in the exhaust passage. An anode made of a thin platinum film is formed on an inside surface of this cylindrical body and a cathode made of a thin platinum film is formed on an outside surface of this cylindrical body, respectively. The cathode is covered by a porous layer. Constant voltage is applied between the cathode and anode. In this $O_2$ sensor 22, as shown in FIG. 9, a current I (mA) proportional to the air-fuel ratio A/F flows between the cathode and anode. Note that, in FIG. 9, $I_0$ indicates the current when the air-fuel ratio A/F is the stoichiometric air-fuel ratio (=14.6). As seen from FIG. 9, when the air-fuel ratio A/F is lean, the current I is increased as the air-fuel ratio A/F becomes larger within a range where $I > I_0$, and the current I becomes zero when the air-fuel ratio A/F becomes rich of almost 13.0 or less.

Figure 10:
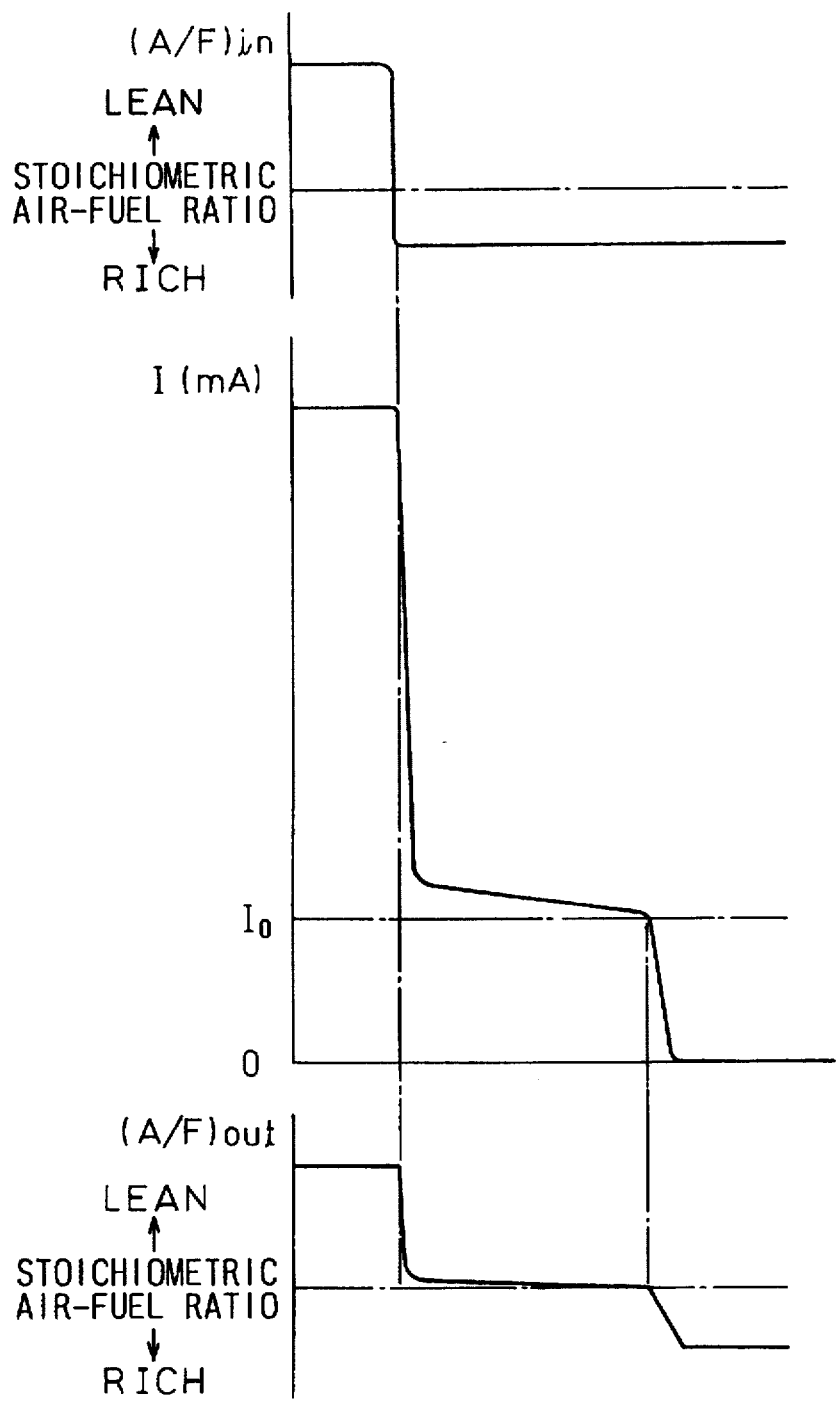
FIGS. 10 and 11 are time charts showing the change of the value of a current flowing between the anode and cathode of the $NO_x$ sensor.

FIG. 10 shows the change of the air-fuel ratio $(A/F)_{in}$ of the exhaust gas flowing into the $NO_x$ absorbent 18, the change of the current I flowing between the cathode and anode of the $O_2$ sensor 22, and the change of the air-fuel ratio (A/F) of the exhaust gas flowing out from the $NO_x$ absorbent 18. As shown in FIG. 10, when the air-fuel ratio (A/F) of the exhaust gas flowing into the $NO_x$ absorbent 18 is changed from lean to rich and the $NO_x$ releasing action from the $NO_x$ absorbent 18 is started, the air-fuel ratio $(A/F)_{out}$ of the exhaust gas flowing out from the $NO_x$ absorbent 18 abruptly becomes small to near the stoichiometric air-fuel ratio, and therefore the current I is abruptly decreased to near $I_0$. Subsequently, in a term when the $NO_x$ releasing action from the $NO_x$ absorbent 18 is carried out, the air-fuel ratio $(A/F)_{out}$ of the exhaust gas flowing out from the $NO_x$ absorbent 18 is held in a slightly lean state, and therefore the current I is held at a value slightly larger than the $I_0$. Subsequently, when all of the $NO_x$ absorbed in the $NO_x$ absorbent 18 is released, the air-fuel ratio (A/F) of the exhaust gas flowing out from the $NO_x$ absorbent 18 abruptly becomes small and becomes rich, and therefore the current I abruptly falls to zero.

Figure 11:
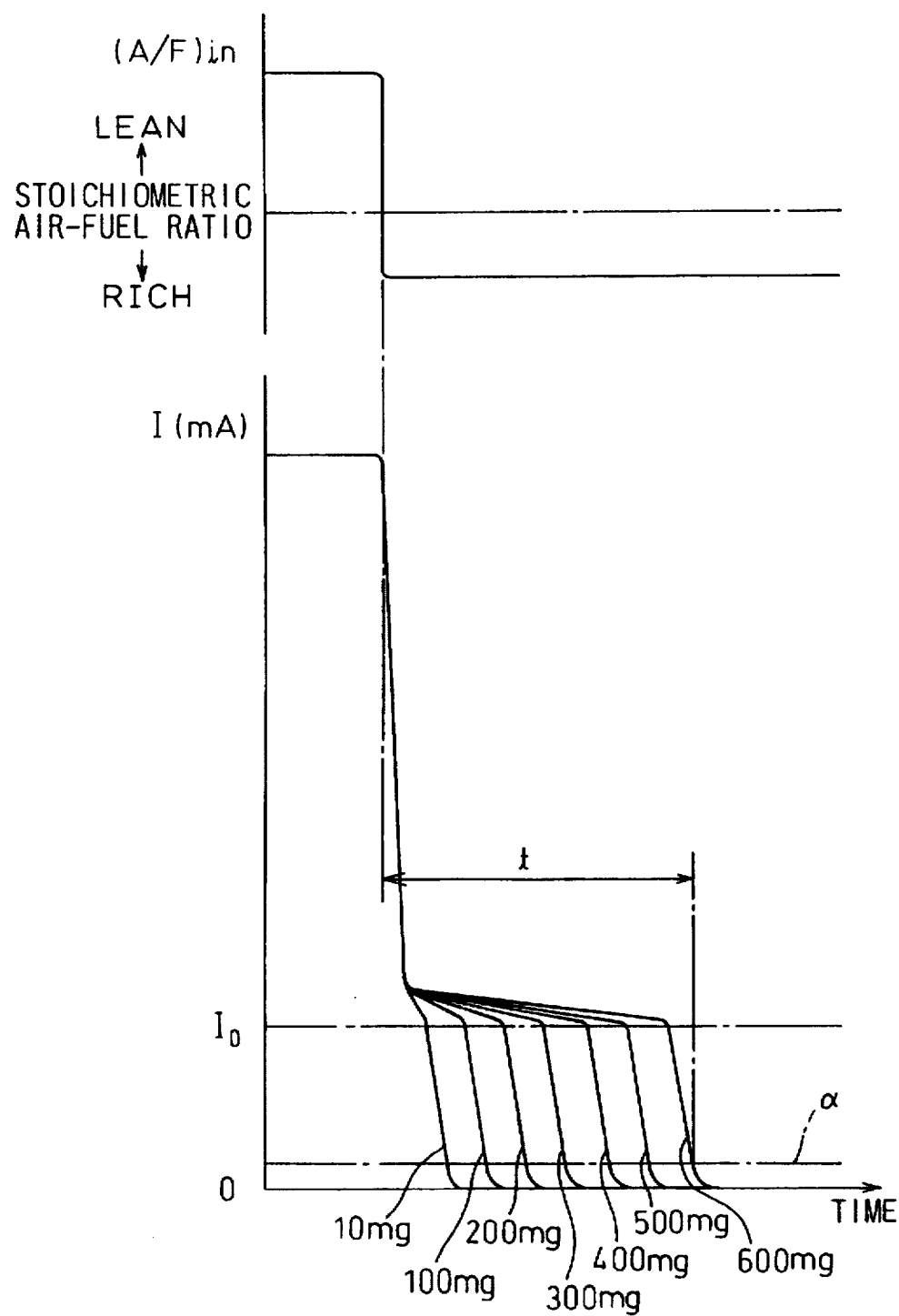

FIG. 11 shows the change of the current I where the amount of $NO_x$ contained in the $NO_x$ absorbent 18 differs. Note that, in FIG. 11, the numerical values indicate the amount of $NO_x$ absorbed in the $NO_x$ absorbent 18. As shown in FIG. 11, when the amount of $NO_x$ absorbed in the $NO_x$ absorbent 18 is different, along with this, an elapsed time t from when the air-fuel ratio $(A/F)_{in}$ of the exhaust gas flowing into the $NO_x$ absorbent 18 is changed from lean to rich to when the current I becomes almost zero changes. The smaller the amount of $NO_x$ absorbed in the $NO_x$ absorbent 18, the shorter this elapsed time. $NO_x$ is continuously released from the $NO_x$ absorbent 18 for almost this elapsed time t. If the entire amount of $NO_x$ released during this elapsed time t is found, the entire amount of $NO_x$ absorbed in the $NO_x$ absorbent 18 will be seen.

Note that, as mentioned before, the amount of release of NOXD of $NO_x$ released from the $NO_x$ absorbent 18 is represented by the following equation:

$$NOXD = f_1 \cdot (K-1.0) \cdot TP \cdot N$$

Accordingly, if the total sum of the amount of release of $NO_x$ NOXD during the elapsed time t is found, the entire amount of $NO_x$ actually absorbed in the $NO_x$ absorbent 18 can be detected.

By the way, to detect the maximum amount of absorption of $NO_x$ possible by the $NO_x$ absorbent 18, that is, the degree of deterioration of the $NO_x$ absorbent 18, at detection, the amount of absorption $\pi NOX$ of $NO_x$ of the $NO_x$ absorbent 18 must become the maximum amount of absorption of $NO_x$. Namely, when assuming that the $VNO_x$ indicated by the broken line in FIG. 7 is the maximum amount of absorption of $NO_x$ which is actually possible, when the amount of absorption of $NO_x$ $\Sigma NOX$ of the $NO_x$ absorbent 18 is smaller than this $VNO_x$, even if all of the $NO_x$ is released from the $NO_x$ absorbent 18, the maximum amount of absorption of $NO_x$ $VNO_x$ cannot be found. This is because the entire amount of $NO_x$ released at this time is smaller than the maximum amount of absorption of $NO_x$.

Contrary to this, when the $NO_x$ is released from the $NO_x$ absorbent 18 when the absorbing capability of the $NO_x$ absorbent 18 is saturated, the entire amount of $NO_x$ released at this time represents the maximum amount of absorption of $NO_x$ $VNO_x$. Therefore, in the embodiment according to the present invention, a decision level SAT which is slightly larger than the value near the maximum amount of absorption of $NO_x$ $VNO_x$ at present is set, and as shown in FIG. 7. When the amount of absorption of $NO_x$ $\Sigma NOX$ of the $NO_x$ absorbent 18 reaches this decision level SAT, the entire $NO_x$ is released from the $NO_x$ absorbent 18, whereby the actual amount of absorption of $NO_x$ $VNO_x$, that is, the degree of deterioration of the $NO_x$ absorbent 18 at this time, is found.

Note that, as shown in FIG. 7, the allowable maximum value MAX with respect to the amount of $NO_x$ $\Sigma NOX$ is set to a value smaller than the maximum amount of absorption of $NO_x$ $VNO_x$, and when the $\Sigma NOX$ reaches the allowable maximum value MAX, the decision of deterioration of the $NO_x$ absorbent 18 is not carried out, and only the action of releasing $NO_x$ from the $NO_x$ absorbent 18 is carried out. The frequency of only the action of releasting the $NO_x$ from the $NO_x$ absorbent 18 being carried out is higher than the frequency of the decision of deterioration of the $NO_x$ absorbent 18 being carried out, and therefore for a period after the decision of deterioration of the $NO_x$ absorbent 18 is carried out and until the next decision of deterioration of the $NO_x$ absorbent 18 is carried out, a number of actions of releasing $NO_x$ are carried out.

The amount of absorption of $NO_x$ $\Sigma NOX$ of the $NO_x$ absorbent 18 is, however, an estimated amount as mentioned before, and therefore this amount of absorption of $NO_x$ $\Sigma NOX$ does not always represent the actual amount of absorption of $NO_x$. In this case, if for example the amount of absorption of $NO_x$ $\Sigma NOX$ indicates a considerably higher value than the actual amount of absorption of $NO_x$, even if the amount of absorption of $NO_x$ $\Sigma NOX$ reaches the decision level SAT, the actual amount of absorption of $NO_x$ does not reach the actual maximum amount of absorption of $NO_x$ $VNO_x$, and thus there arises a problem in that the actual maximum amount of absorption of $NO_x$ $VNO_x$ cannot be correctly detected.

Therefore, in the embodiment according to the present invention, a correction value KX with respect to the amount of absorption of $NO_x$ $\Sigma NOX$ is introduced. Whenever the amount of absorption of $NO_x$ $\Sigma NOX$ reaches the allowable maximum value MAX and the release of $NO_x$ from the $NO_x$ absorbent 18 is carried out, the actual amount of absorption of $NO_x$ $XNO_x$ is calculated on the basis of the output signal of the $NO_x$ sensor 22, and the correction value KX is updated on the basis of the following equation:

$$KX = KX \cdot (XNO_x / \Sigma NOX)$$

In this case, the corrected estimated amount of $NO_x$ is represented by $\Sigma NKX$ (=$KX \cdot \Sigma NOX$). Namely, where for example the estimated amount of absorption of $NO_x$ $\Sigma NOX$ becomes smaller than the actual amount of absorption of $NO_x$ $XNO_x$, the value of the correction value KX is increased with respect to the value of the correction value KX which has been used heretofore so that $\Sigma NKX$ (=$KX \cdot \Sigma NOX$) coincides with $XNO_x$. Accordingly, in the embodiment according to the present invention, in actuality, not when the estimated amount of $NO_x$ $\Sigma NOX$ reaches MAX, but when the corrected estimated amount of $NO_x$ $\Sigma NOX$ reaches the allowable maximum value MAX, the action of releasing $NO_x$ is carried out.

When the maximum amount of absorption of $NO_x$ $VNO_x$ becomes small, that is, when the degree of deterioration of the $NO_x$ absorbent 18 becomes high, the allowable maximum value MAX becomes small, and thus as seen from FIG. 7, a cycle at which the air-fuel ratio is made rich for releasing $NO_x$ becomes short. Further, when the degree of deterioration of the $NO_x$ absorbent 18 becomes high and the allowable maximum value MAX becomes small, the time required for the release of $NO_x$ becomes short, so the time during which the air-fuel ratio is maintained rich becomes short. Accordingly, when the degree of deterioration of the $NO_x$ absorbent 18 is low, as shown in FIG. 8A, a cycle $t_1$ when the air-fuel ratio is made rich and the time $t_2$ during which the air-fuel ratio is maintained rich are relatively long, and when the degree of deterioration of the $NO_x$ absorbent 18 becomes high, as shown in FIG. 8B, a cycle when the air-fuel ratio is made rich and the time during which the air-fuel ratio is maintained rich become short.

As mentioned above, in the embodiment according to the present invention, the actual amount of $NO_x$, $VNO_x$ and $XNO_x$ are calculated on the basis of the current I flowing between the cathode and anode of the $O_2$ sensor 22 and the air-fuel ratio is controlled to release $NO_x$ on the basis of these values of $VNO_x$ and $XNO_x$. In this case, the current I flowing between the cathode and anode of the $O_2$ sensor 22 is converted to a voltage and input into the input port 36. In the electronic control unit 30, this voltage is converted to the corresponding current I again and the air-fuel ratio is controlled on the basis of the current value I.

Figure 12:
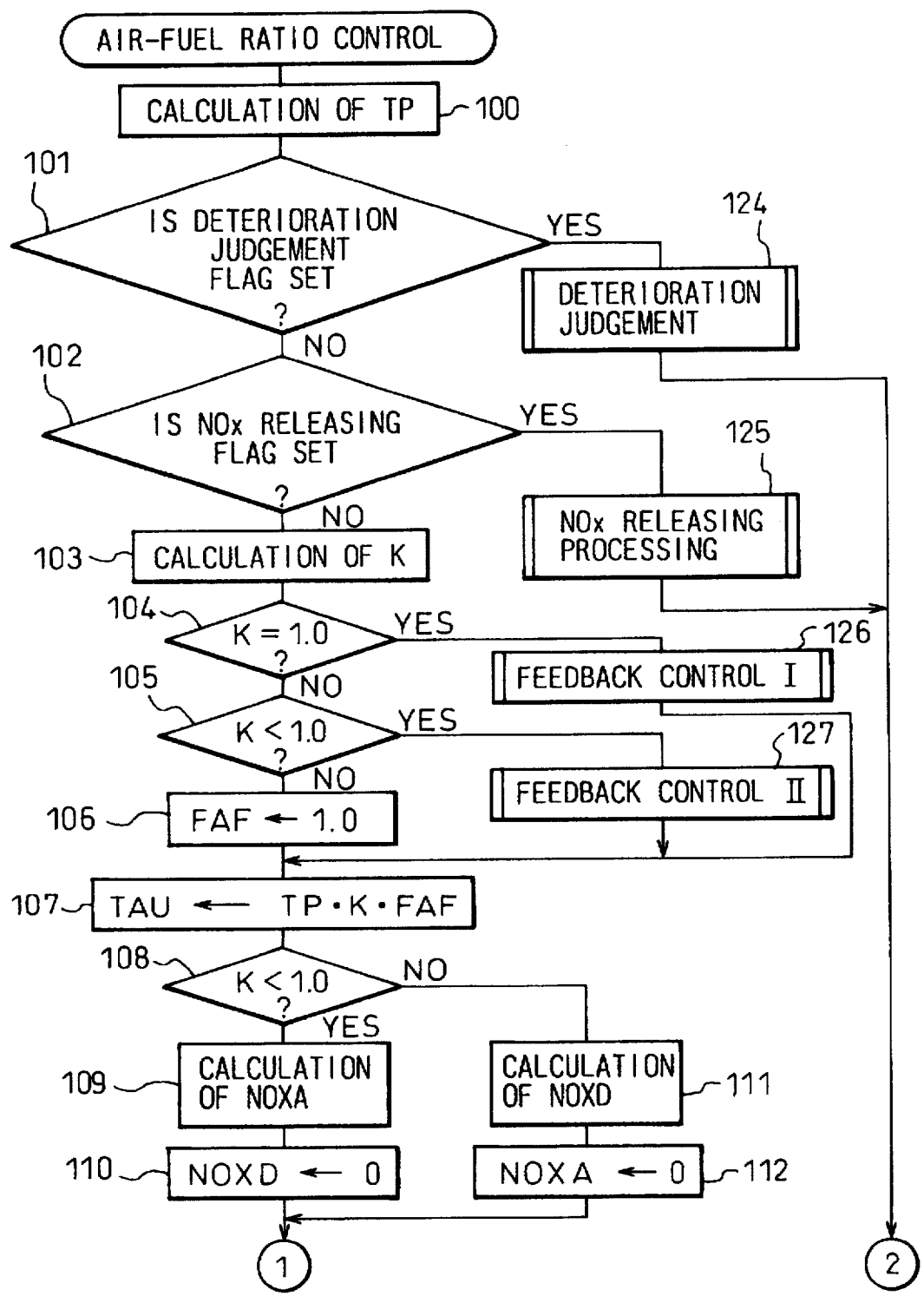
FIGS. 12 and 13 are flow charts of the control of the air-fuel ratio.
Figure 13:
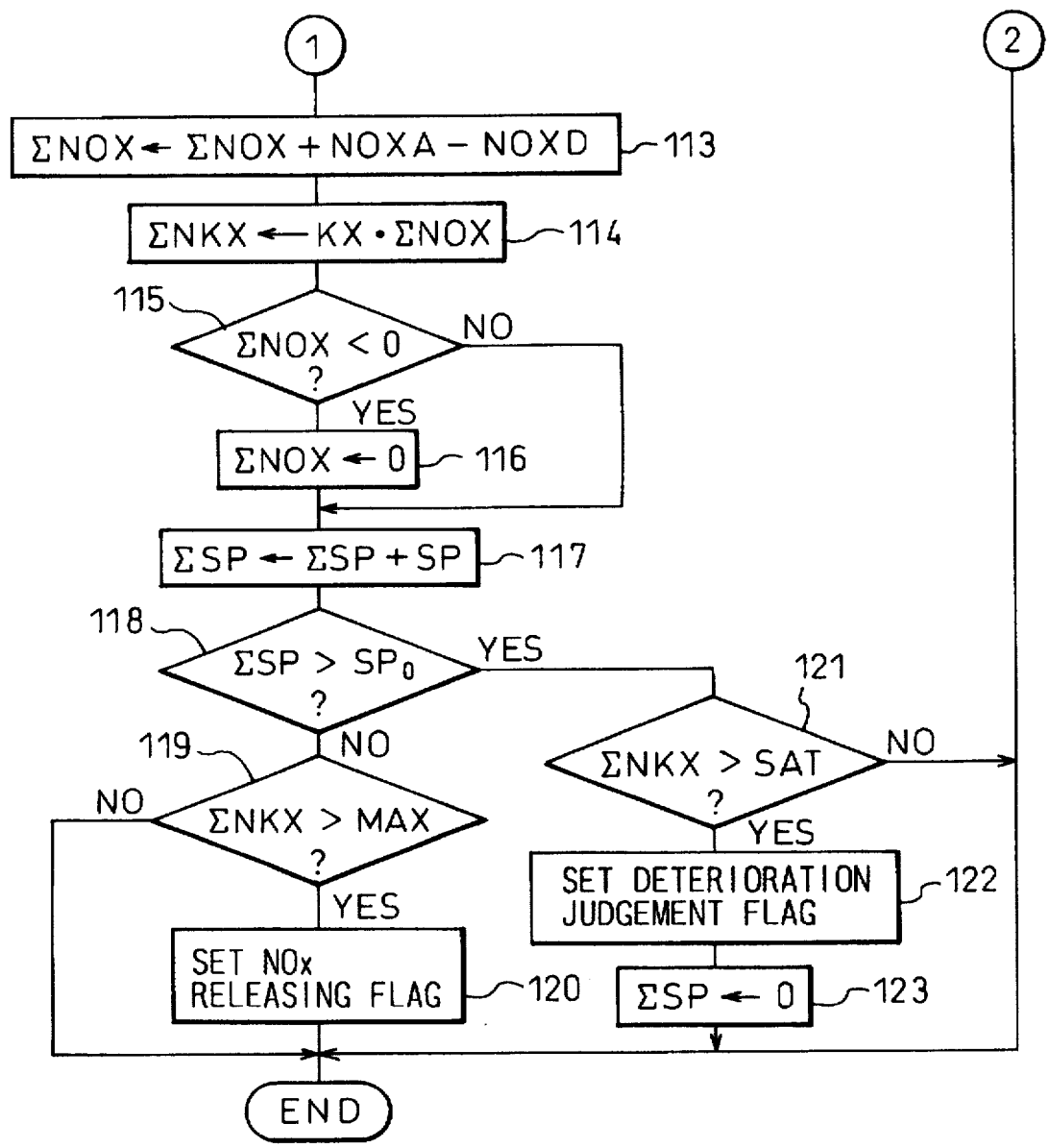

FIG. 12 and FIG. 13 show a routine for control of the air-fuel ratio. This routine is executed by interruption at every predetermined time interval.

Referring to FIG. 12 and FIG. 13, first of all, at step 100, a basic fuel injection time TP is calculated from the relationship shown in FIG. 2. Subsequently, at step 101, it is determined whether or not a decision of deterioration flag indicating that the degree of deterioration of the $NO_x$ absorbent 18 should be decided has been set. When the decision of deterioration flag has not been set, the processing routine proceeds to step 102, where it is determined whether or not the $NO_x$ releasing flag indicating that the $NO_x$ should be released from the $NO_x$ absorbent 18 has been set. When the $NO_x$ releasing flag has not been set, the processing routine proceeds to step 103.

Figure 14:
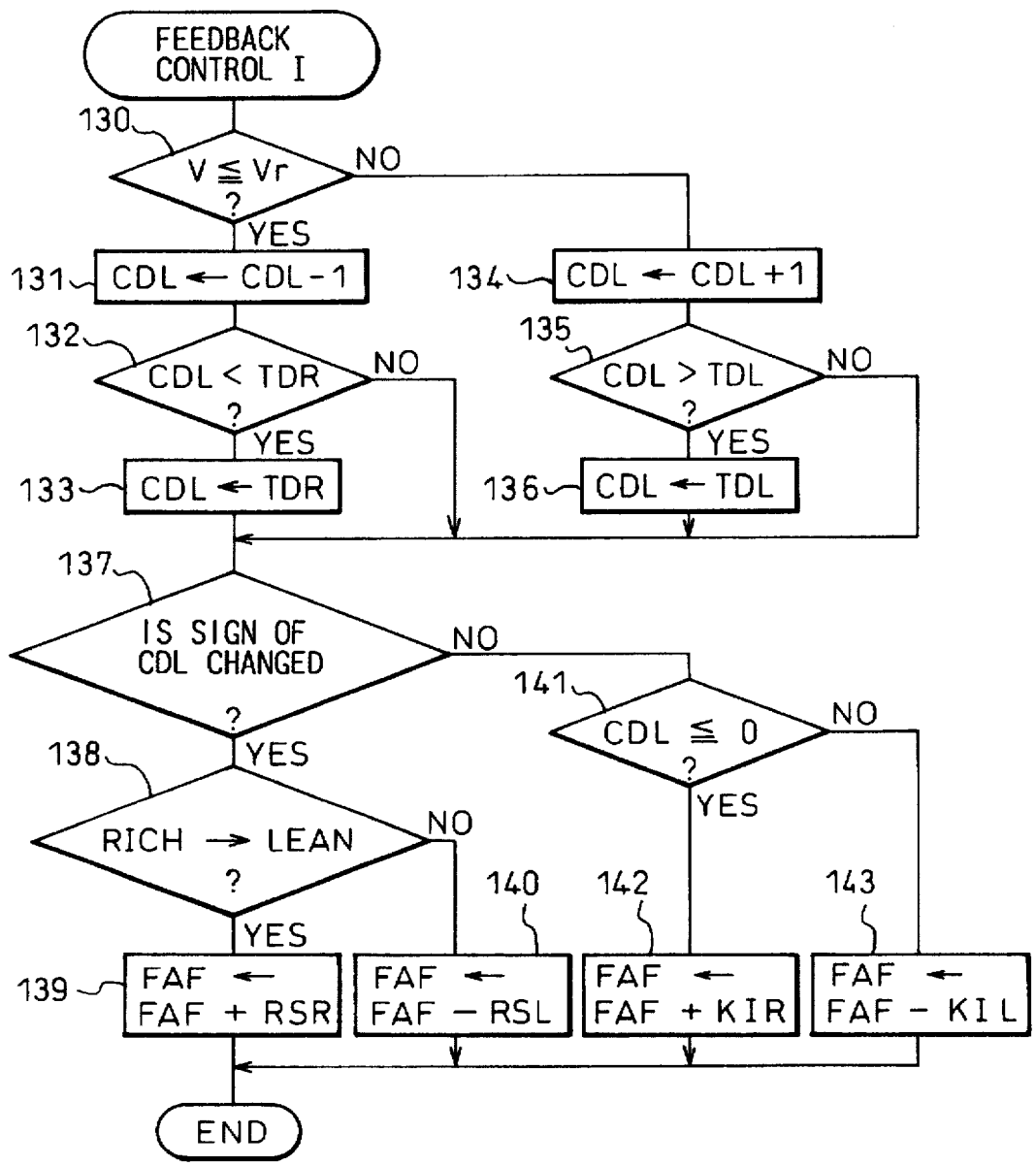
FIG. 14 is a flow chart of a feedback control I.
Figure 16:
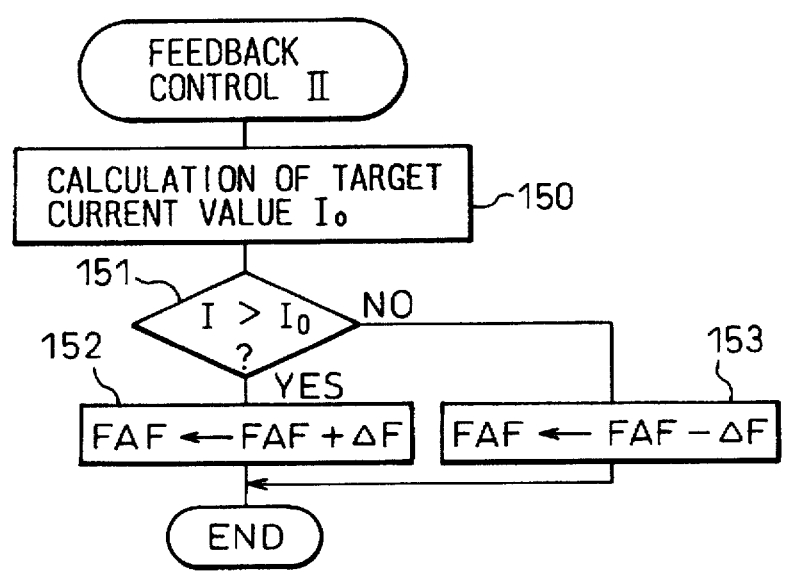
FIG. 16 is a flow chart of a feedback control II.

At step 103, the correction coefficient K is calculated on the basis of FIG. 3. Subsequently, at step 104, it is determined whether or not the correction coefficient K is 1.0. When K=1.0, that is, when the air-fuel ratio of the air-fuel mixture should be made the stoichiometric air-fuel ratio, the processing routine proceeds to step 126, at which the feedback control I of the air-fuel ratio is carried out. This feedback control I is shown in FIG. 14. On the other hand, when K does not equal 1.0, the processing routine proceeds to step 105, at which it is determined whether or not the correction coefficient K is smaller than 1.0. When K<1.0, that is, when the air-fuel ratio of the lean air-fuel mixture should be made lean, the processing routine proceeds to step 127, at which the feedback control II of the air-fuel ratio is carried out. This feedback control II is shown in FIG. 16. On the other hand, when K is not smaller than 1.0, the processing routine proceeds to step 106, at which FAF is fixed to 1.0, and then the processing routine proceeds to step 107. At step 107, the fuel injection time TAU is calculated on the basis of the following equation:

$$TAU = TP \cdot K \cdot FAF$$

Subsequently, at step 108, it is determined whether or not the correction coefficient K is smaller than 1.0. When K<1.0, that is, when a lean air-fuel mixture should be burned, the processing routine proceeds to step 109, at which the amount of absorption of $NO_x$ NOXA is calculated from FIG. 6. Subsequently, at step 110, the amount of absorption of $NO_x$ NOXD is made zero, and then the processing routine proceeds to step 113. Contrary to this, at step 108, when K≧1.0 is determined, that is, when an air-fuel mixture of the stoichiometric air-fuel ratio or the rich air-fuel mixture should be burned, the processing routine proceeds to step 111, at which the amount of absorption of $NO_x$ NOXD is calculated on the basis of the following equation:

$$NOXD = f \cdot (K-1) \cdot TP \cdot N$$

Subsequently, at step 112, the amount of absorption of $NO_x$ NOXA is made zero, and then the processing routine proceeds to step 113. At step 113, the amount ΣNOX estimated to be absorbed in the $NO_x$ absorbent 18 is calculated on the basis of the following equation.

$$\Sigma NOX = \Sigma NOX + NOXA - NOXD$$

Subsequently, at step 114, by multiplying the estimated amount of $NO_x$ ΣNOX by KX, the corrected estimated amount of $NO_x$, that is, the actual amount of $NO_x$ ΣNKX is calculated. Subsequently, at step 115, it is determined whether or not the ΣNOX becomes negative. When ΣNOX becomes smaller than 0, the processing routine proceeds to step 116, at which the ΣNOX is made zero. Subsequently, at step 117, a current vehicle speed SP is added to ΣSP. This ΣSP indicates the cumulative traveling distance of the vehicle. Subsequently, at step 118, it is determined whether or not the cumulative travelling distance ΣSP is larger than the set value $SP_0$. When ΣSP ≦ $SP_0$, the processing routine proceeds to step 119, at which it is determined whether or not the ΣNKX exceeds the allowable maximum value MAX (FIG. 7). When ΣNKX becomes larger than MAX, the processing routine proceeds to step 120, at which the $NO_x$ releasing flag is set.

On the other hand, when it is determined at at step 118 that ΣSP>$SP_0$, the processing routine proceeds to step 121, at which it is determined whether or not the amount of $NO_x$ ΣNKX becomes larger than SAT (FIG. 7). When ΣNKX becomes larger than SAT, the processing routine proceeds to step 122, at which the decision of deterioration flag is set, and then at step 123, ΣSP is made zero.

Figure 17:
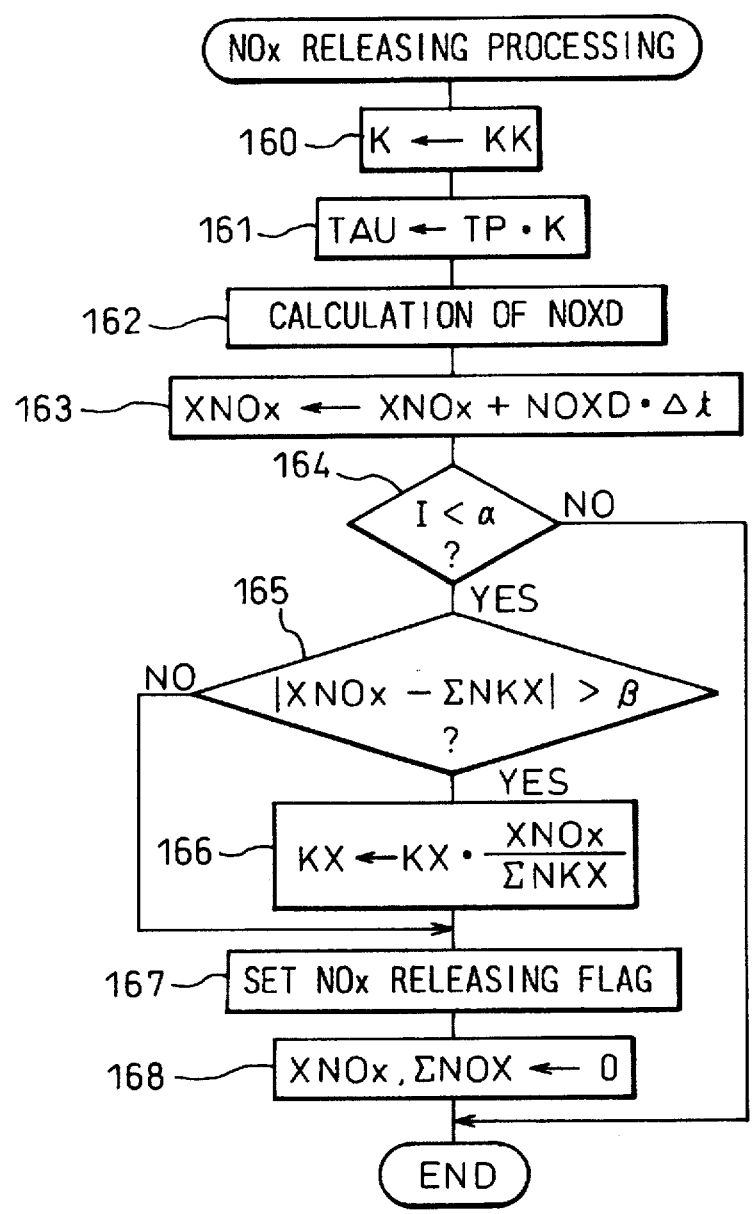
FIG. 17 is a flow chart of processing for release of $NO_x$.
Figure 18:
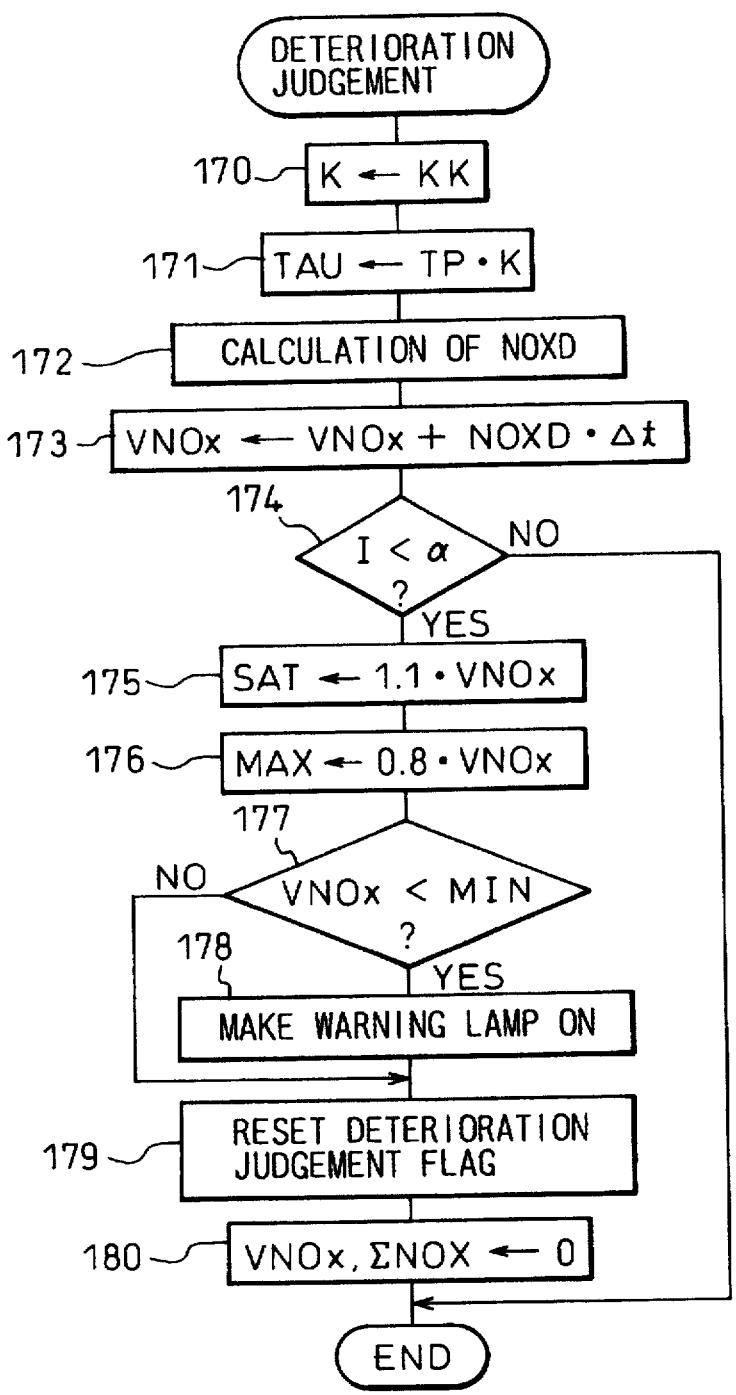
FIG. 18 is a flow chart of a decision of deterioration.

When the decision of deterioration flag is set, the processing routine goes from step 101 to step 124, at which the decision of deterioration is carried out. This decision of deterioration is shown in FIG. 18. On the other hand, when the $NO_x$ releasing flag is set, the processing routine proceeds from step 102 to step 125, at which the processing for release of $NO_x$ is performed. This processing for release of $NO_x$ is shown in FIG. 17.

Next, an explanation will be made of the feedback control I to be carried out at step 126 of FIG. 12, that is, the feedback control for maintaining the air-fuel ratio at the stoichiometric air-fuel ratio on the basis of the output signal of the $O_2$ sensor 22 referring to FIG. 14 and FIG. 15.

Figure 15:
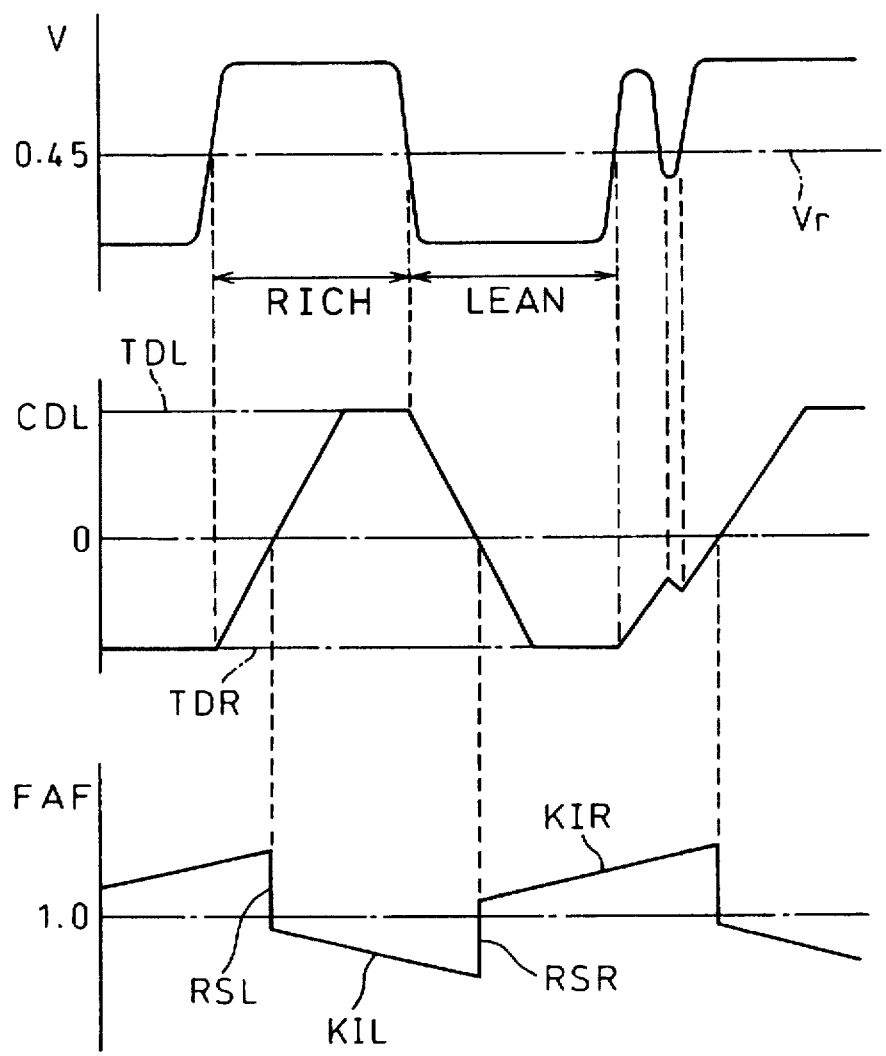
FIG. 15 is a time chart of the change of a feedback correction coefficient FAF.

As shown in FIG. 15, the $O_2$ sensor 20 generates an output voltage V of about 0.9 V when the air-fuel ratio of the air-fuel mixture is rich and generates an output voltage V of about 0.1 V when the air-fuel ratio of the air-fuel mixture is lean. The feedback control I shown in FIG. 14 is carried out on the basis of the output signal of this $O_2$ sensor 20.

Referring to FIG. 14, first of all, it is determined at step 130 whether or not the output voltage V of the $O_2$ sensor 20 is smaller than a reference voltage Vr of about 0.45 V. When V≦Vr, that is, when the air-fuel ratio is lean, the processing routine proceeds to step 131, at which the delay count CDL is decremented exactly by one. Subsequently, at step 132, it is determined whether or not the delay count CDL becomes smaller than the minimum value TDR. When CDL becomes smaller than TDR, the processing routine proceeds to step 133, at which the CLD is made TDR and then the processing routine proceeds to step 137. Accordingly, as shown in FIG. 15, when V becomes equal to or smaller than Vr, the delay count value CDL is gradually decreased, and subsequently, the CDL is maintained at the minimum value TDR.

On the other hand, when it is determined at step 130 that V>Vr, that is, when the air-fuel ratio is rich, the processing routine proceeds to step 134, at which the delay count CDL is incremented exactly by one. Subsequently, at step 135, it is determined whether or not the delay count CDL becomes larger than the maximum value TDL. When CDL becomes larger than TDL, the processing routine proceeds to step 136, at which the CDL is made TDL and then the processing routine proceeds to step 137. Accordingly, as shown in FIG. 15, when V becomes larger than Vr, the delay count CDL is gradually increased, and then CDL is maintained at the maximum value TDL.

At step 137, it is determined whether or not the sign of the delay count CDL is inverted from positive to negative or from negative to positive in a period from the previous processing cycle to this processing cycle. When the sign of the delay count CDL is inverted, the processing routine proceeds to step 138, at which it is determined whether or not it is an inversion from positive to negative, that is, whether or not it is an inversion from rich to lean. When it is an inversion from rich to lean, the processing routine proceeds to step 139, at which the rich skip value RSR is added to the feedback correction coefficient FAF and thus, as shown in FIG. 15, the FAF is abruptly increased exactly by the rich skip value RSR. Contrary to this, at the time of an inversion from lean to rich, the processing routine proceeds to step 140, at which the lean skip value RSL is subtracted from the FAF, and thus as shown in FIG. 15, the FAF is abruptly decreased exactly by the lean skip value RSL.

On the other hand, when it is determined at step 137 that the sign of the delay count CDL is not inverted, the processing routine proceeds to step 141, at which it is determined whether or not the delay count CDL is negative. When CDL≦0, the processing routine proceeds to step 142, at which the rich integration value KIR (KIR<RSR) is added to the feedback correction coefficient FAF, and thus as shown in FIG. 15, the FAF is gradually increased. On the other hand, when CDL>0, the processing routine proceeds to step 143, at which rich integration value KIL (KIL<RSL) is subtracted from FAF, and thus the FAF is gradually decreased as shown in FIG. 15. In this way, the air-fuel ratio is controlled to the stoichiometric air-fuel ratio.

Next, an explanation will be made of the feedback control for maintaining the air-fuel ratio to the target lean air-fuel ratio corresponding to the correction coefficient K on the basis of the feedback control II carried out at step 127 of FIG. 12, that is, the current I of the $O_2$ sensor 22, referring to FIG. 16.

Referring to FIG. 16, first of all, at step 150, the target current value $I_0$ corresponding to the target lean air-fuel ratio is calculated from the relationship shown in FIG. 9. Subsequently, at step 151, it is determined whether or not the current I of the $O_2$ sensor 22 is larger than the target current $I_0$. When I>$I_0$, the processing routine proceeds to step 152, at which a constant value ΔF is added to the feedback correction coefficient FAF, and when I ≦$I_0$, the processing routine proceeds to step 153, at which the constant value ΔF is subtracted from the feedback correction coefficient FAF. In this way, the air-fuel ratio is maintained at the target lean air-fuel ratio.

Next, an explanation will be made of the control for release of $NO_x$ carried out at step 125 of FIG. 12 referring to FIG. 17.

Referring to FIG. 17, first of all, at step 160, the correction coefficient K is made a constant value KK of for example about 1.3. Subsequently, at step 161, the fuel injection time TAU is calculated on the basis of the following equation:

$$TAU=TP \cdot K$$

Accordingly, when the processing for release of $NO_x$ is started, the feedback control of the air-fuel ratio is stopped, and the air-fuel ratio of the air-fuel mixture is made rich. Subsequently, at step 162, the amount of release NOXD of the $NO_x$ released from the $NO_x$ absorbent 18 per unit time is calculated as follows:

$$NOXD=f \cdot (K-1.0) \cdot TP \cdot N$$

Subsequently, at step 163, the amount of release $XNO_x$ of $NO_x$ actually released from the $NO_x$ absorbent 18 is calculated on the basis of the following equation. Note that, in the following equation, Δt represents the interval of the time interruption.

$$XNO_x=XNO_x+NOXD \cdot \Delta t$$

Subsequently, at step 164, it is determined whether or not the current I of the $O_2$ sensor 22 becomes lower than the predetermined constant value α (FIG. 11). When I becomes smaller than α, the processing routine proceeds to step 165, at which it is determined whether or not the absolute value |$XNO_x$−ΣNKX| of the difference between the actual amount of release of $NO_x$, $XNO_x$ and the corrected estimated amount of absorption of $NO_x$, ΣNKX is larger than the constant value β. When |$XNO_x$−ΣNKX|≦β, the processing routine jumps to step 167. Contrary to this, when |$XNO_x$−ΣNKX|>β, the processing routine proceeds to step 166, at which the correction value KX is corrected on the basis of the following equation:

$$KX=KX \cdot XNO_x/\Sigma NKX$$

Subsequently, at step 167, the $NO_x$ releasing flag is reset, and thus the air-fuel ratio of the air-fuel mixture is changed to the air-fuel ratio determined according to the operating state at that time, usually lean. Subsequently, at step 168, $XNO_x$ and ΣNOX are made zero.

Next, an explanation will be made of the decision of deterioration carried out at step 124 of FIG. 12 referring to FIG. 18.

Referring to FIG. 18, first of all, at step 170, the correction coefficient K is made the constant value KK or for example about 1.3. Subsequently, at step 171, the fuel injection time TAU is calculated on the basis of the following equation:

$$TAU=TP \cdot K$$

Accordingly, when the decision of deterioration is started, the feedback control of the air-fuel ratio is stopped, and the air-fuel ratio of the air-fuel mixture is made rich. Subsequently, at step 172, the amount of release NOXD of $NO_x$ released from the $NO_x$ absorbent 18 is calculated based on the following equation:

$$NOXD=f \cdot (K-1.0) \cdot TP \cdot N$$

Subsequently, at step 173, the amount of release $VNO_x$ of $NO_x$ actually released from the $NO_x$ absorbent 18 is calculated on the basis of the following equation. Note that, in the following equation, Δt represents the interval of the time interruption.

$$VNO_x=VNO_x+NOXD \cdot \Delta t$$

Subsequently, at step 174, it is determined whether or not the current I of the $O_2$ sensor 22 becomes lower than the predetermined constant value α (FIG. 11). When I becomes smaller than α, the processing routine proceeds to step 175, at which by multiplying the $VNO_x$ by a constant value larger than 1.0, for example 1.1, the decision level SAT (=1.1·$VNO_x$) is calculated. In this way, the decision level SAT is set to a value larger than $VNO_x$, so this $VNO_x$ represents the maximum amount of absorption of $NO_x$ possible by the $NO_x$ absorbent 18. Namely, if $VNO_x$ represents an amount of absorption of $NO_x$ smaller than the maximum amount of absorption of $NO_x$, the decision level SAT becomes large whenever the decision of deterioration is carried out, and thus finally the $VNO_x$ represents the maximum amount of absorption of $NO_x$, that is, the degree of deterioration of the $NO_x$ absorbent 18.

So as to find the decision level SAT, of course it is also possible to multiply another numerical value other than 1.1 with $VNO_x$, and the decision level SAT can be found by multiplying any number of 1.0 or more with $VNO_x$. Note, if the numerical value to be multiplied with $VNO_x$ is made too large, the time from when the amount of absorption of $NO_x$ of the $NO_x$ absorbent 18 becomes the maximum amount of absorption of $NO_x$ to when the action of release of $NO_x$ is carried out becomes too long, so the amount of $NO_x$ discharged to the atmosphere is increased. Accordingly, it is not preferred that the numerical value to be multiplied with $VNO_x$ be set too large. This numerical value is preferably about 1.3 or less.

When the decision level SAT is calculated at step 175, the processing routine proceeds to step 176, at which by multiplying a positive numerical value of 1.0 or less, for example 0.8, with the $VNO_x$, the allowable maximum value MAX (=0.8·$VNO_x$) is calculated. Namely, the allowable maximum value MAX is also updated in accordance with the degree of deterioration of $NO_x$ absorbent 18. Subsequently, at step 177, it is determined whether or not the maximum amount of absorption of $NO_x$, $VNO_x$ reaches the predetermined minimum value MIN. When $VNO_x$ becomes smaller than MIN, the processing routine proceeds to step 178, at which the alarm lamp 25 is turned on. Subsequently, at step 179, the decision of deterioration flag is reset. When the decision of deterioration flag is reset, the air-fuel ratio of the air-fuel mixture is changed to the air-fuel ratio in accordance with the operating state at that time, usually lean. Subsequently, at step 180, $VNO_x$ and $\Sigma NOX$ are made zero.

FIG. 19 to FIG. 23 show another embodiment. Also in this embodiment, the decision of deterioration of the $NO_x$ absorbent 18 is carried out when the corrected amount of absorption of $NO_x$ $\Sigma NKX$ exceeds the decision level SAT, but control for release of $NO_x$ from the decision of deterioration to when the next decision of deterioration is carried out can be carried out by a simpler method compared with the first embodiment. Namely, in this embodiment, as shown in FIGS. 19A and 19B, a cycle TL at which the air-fuel ratio of the air-fuel mixture is made rich so as to release the $NO_x$ from the $NO_x$ absorbent 18 and the rich time TR of the air-fuel mixture at this time are determined in accordance with the maximum amount of absorption of $NO_x$, $VNO_x$, that is, the degree of deterioration of the $NO_x$ absorbent 18. Namely, as shown in FIG. 19A, the lower the maximum amount of absorption of $NO_x$, $VNO_x$, in other words, the larger the degree of deterioration of the $NO_x$ absorbent 18, the shorter the cycle TL at which the air-fuel ratio of the air-fuel mixture is made rich, and as shown in FIG. FIG. 19B, the lower the maximum amount of absorption of $NO_x$, $VNO_x$, in other words, the larger the degree of deterioration of the $NO_x$ absorbent 18, the shorter the rich time TR of the air-fuel mixture. Note that, the relationships shown in FIGS. 19A and 19B are preliminarily stored in the ROM 32.

Figure 20:
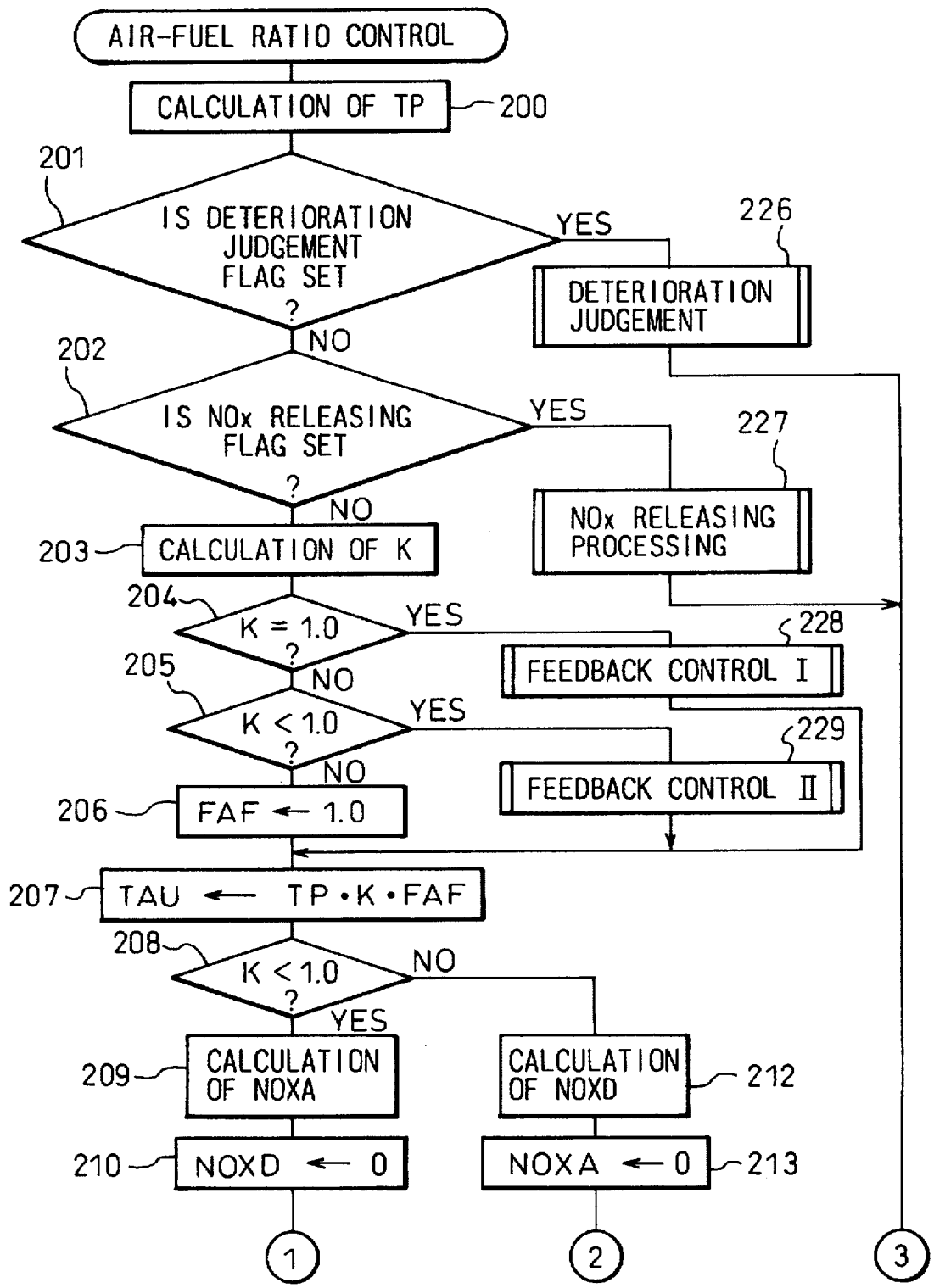
FIGS. 20 and 21 are flow charts of another embodiment for controlling the air-fuel ratio.
Figure 21:
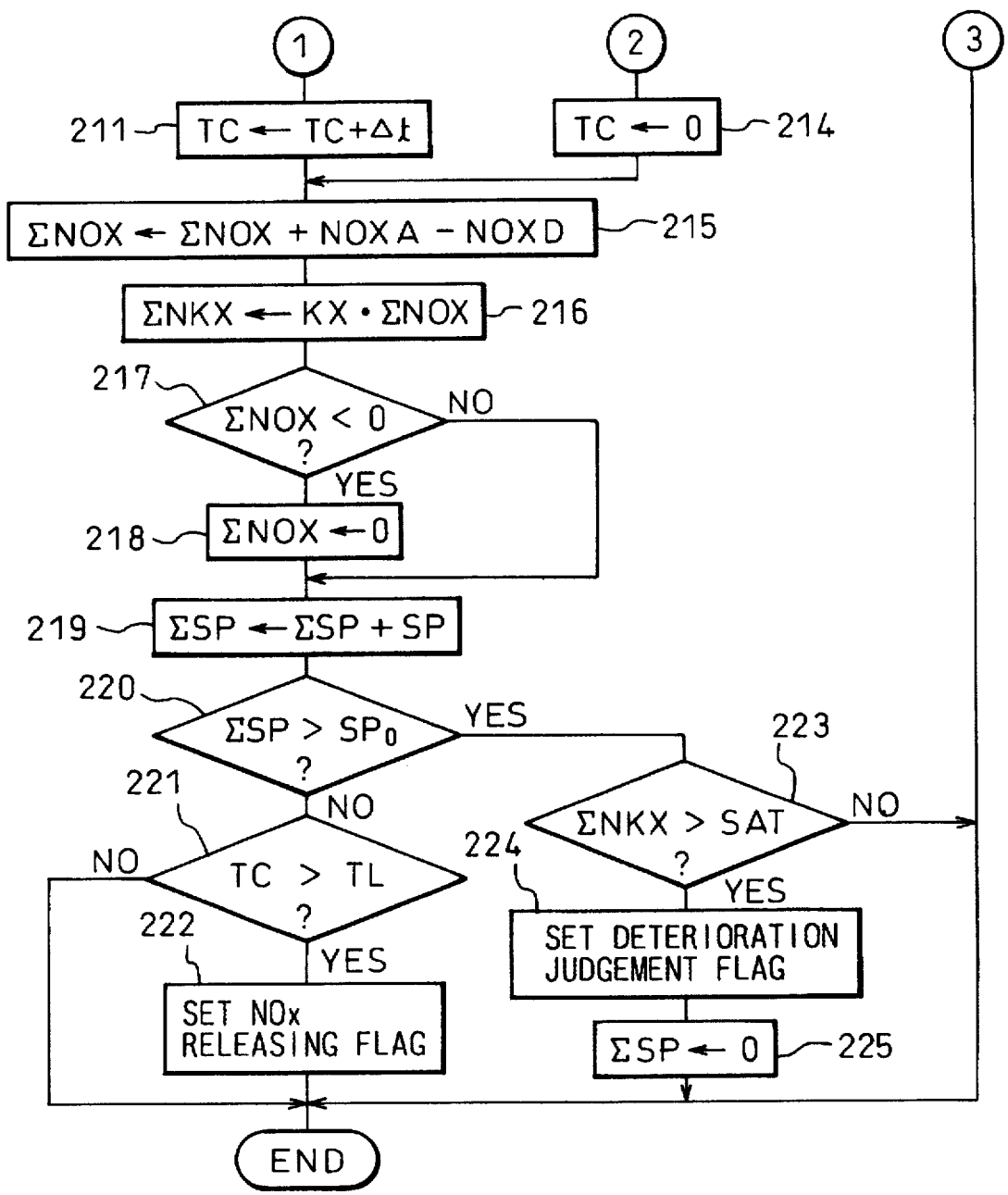

FIG. 20 and FIG. 21 show the routine for control of the air-fuel ratio for this second embodiment. This routine is executed by interruption at every predetermined time interval.

Referring to FIG. 20 and FIG. 21, first of all, at step 200, the basic fuel injection time TP is calculated from the relationship shown in FIG. 2. Subsequently, at step 201, it is determined whether or not the decision of deterioration flag indicating that the degree of deterioration of the $NO_x$ absorbent 18 should be decided has been set. When the decision of deterioration flag has not been set, the processing routine proceeds to step 202, at which it is determined whether or not the $NO_x$ releasing flag indicating that the $NO_x$ should be released from the $NO_x$ absorbent 18 has been set. When the $NO_x$ releasing flag has not been set, the processing routine proceeds to step 203.

At step 203, the correction coefficient K is calculated on the basis of FIG. 3. Subsequently, at step 204, it is determined whether or not the correction coefficient K is 1.0. When K=1.0, that is, when the air-fuel ratio of the air-fuel mixture is made the stoichiometric air-fuel ratio, the processing routine proceeds to step 228, at which the feedback control I of the air-fuel ratio is carried out. This feedback control I is shown in FIG. 14. On the other hand, when K is not equal to 1.0, the processing routine proceeds to step 205, at which it is determined whether or not the correction coefficient K is smaller than 1.0. When K≦1.0, that is, when the air-fuel ratio of the lean air-fuel mixture should be made lean, the processing routine proceeds to step 229, at which the feedback control II of the air-fuel ratio is carried out. This feedback control II is shown in FIG. 16. On the other hand, when K is not smaller than 1.0, the processing routine proceeds to step 206, at which the FAF is fixed to 1.0, and then the processing routine proceeds to step 207. At step 207, the fuel injection time TAU is calculated on the basis of the following equation:

TAU=TP·K·FAF

Subsequently, at step 208, it is determined whether or not the correction coefficient K is smaller than 1.0. When K<1.0, that is, when the lean air-fuel mixture should be burned, the processing routine proceeds to step 209, at which the amount of absorption of $NO_x$ NOXA is calculated from FIG. 6. Subsequently, at step 210, the amount of release of $NO_x$ NOXD is made zero. Subsequently, at step 211, the interval Δt of the time interruption is added to the count value TC. Accordingly, this count TC represents the elapsed time.

At step 211, when the estimated time TC is calculated, the processing routine proceeds to step 215, at which the amount $\Sigma NOX$ of $NO_x$ estimated to be absorbed in the $NO_x$ absorbent 18 is calculated on the basis of the following equation:

$\Sigma NOX = \Sigma NOX + NOXA - NOXD$

On the other hand, when it is determined at step 208 that K≧1.0, that is, when the air-fuel mixture of stoichiometric air-fuel ratio or the rich air-fuel mixture should be burned, the processing routine proceeds to step 212, at which the amount of release of $NO_x$ NOXD is calculated on the basis of the following equation:

NOXD=f·(K−1.0)·TP·N

Subsequently, at step 213, the amount of absorption of $NO_x$ NOXA is made zero, and then at step 214, the elapsed time TC is made zero. Subsequently, the processing routine proceeds to step 215, at which the estimated amount of $NO_x$ $\Sigma NOX$ is calculated.

Subsequently, at step 216, by multiplying the estimated amount of $NO_x$ $\Sigma NOX$ by the correction value KX, the corrected estimated amount of $NO_x$, that is, the actual amount of $NO_x$ $\Sigma NKX$ is calculated. Subsequently, at step 217, it is determined whether or not the $\Sigma NOX$ becomes negative. When $\Sigma NOX$ becomes smaller than 0, the processing routine proceeds to step 218, at which $\Sigma NOX$ is made zero. Subsequently, at step 219, the current vehicle speed SP is added to $\Sigma SP$. This $\Sigma SP$ indicates the cumulative travelling distance of the vehicle. Then, at step 220, it is determined whether or not the cumulative travelling distance $\Sigma SP$ is larger than the set value $SP_0$. When $\Sigma SP \leq SP_0$, the processing routine proceeds to step 221, at which it is determined whether or not the elapsed time TC exceeds the cycle TL shown in FIG. 19A in accordance with the maximum amount of absorption of $NO_x$ $VNO_x$. When TC becomes larger than TL, the processing routine proceeds to step 222, at which the $NO_x$ releasing flag is set.

On the other hand, when it is determined at step 220 that $\Sigma SP > SP_0$, the processing routine proceeds to step 223, at which it is determined whether or not the $\Sigma NKX$ becomes larger than the decision level SAT (FIG. 7). When $\Sigma NKX$ becomes larger than SAT, the processing routine proceeds to step 224, at which the decision of deterioration flag is set, and then, at step 225, $\Sigma SP$ is made zero.

When the decision of deterioration flag is set, the processing routine goes from step 201 to step 226, at which the decision of deterioration is carried out. This decision of deterioration is shown in FIG. 23. On the other hand, when the $NO_x$ releasing flag is set, the processing routine goes from step 202 to step 227, at which the processing for release of $NO_x$ is carried out. This processing for release of $NO_x$ is shown in FIG. 22.

Next, an explanation will be made of the control for releasing $NO_x$ carried out at step 227 of FIG. 20 referring to FIG. 22.

Figure 22:
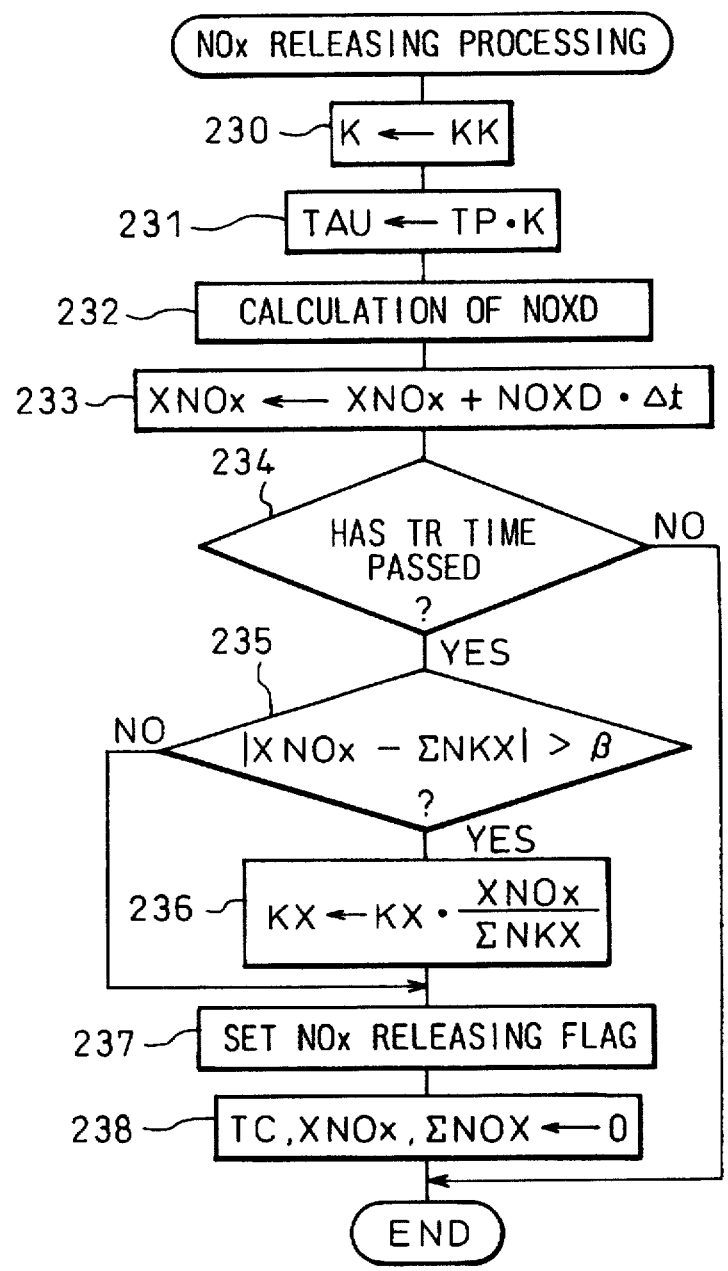
FIG. 22 is a flow chart for the processing for release of $NO_x$.
Figure 23:
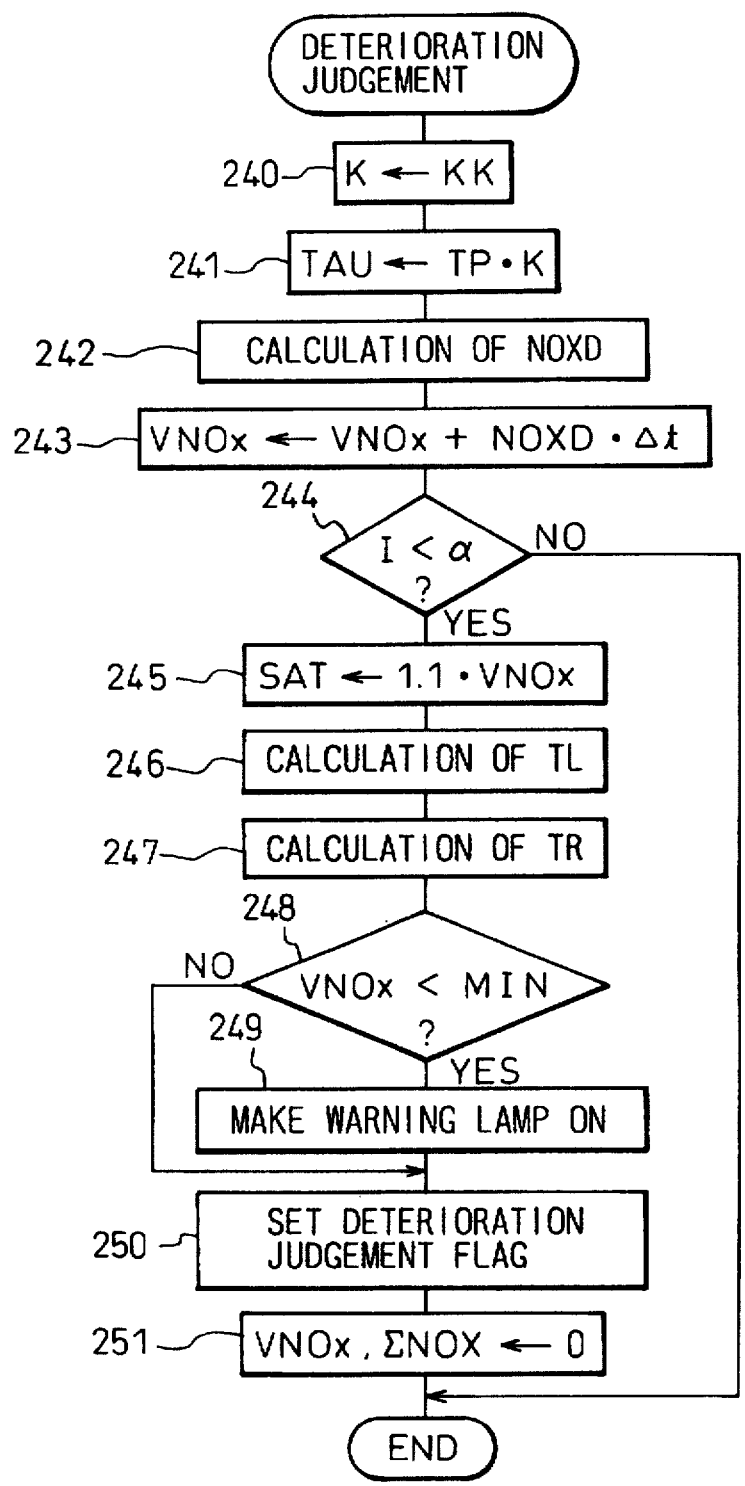
FIG. 23 is a flow chart of a decision of deterioration.

Referring to FIG. 22, first of all, at step 230, the correction coefficient K is made the constant value KK of for example about 1.3. Subsequently, at step 231, the fuel injection time TAU is calculated on the basis of the following equation:

$$TAU = TP \cdot K$$

Accordingly, when the processing for release of $NO_x$ is started, the feedback control of the air-fuel ratio is stopped, and the air-fuel ratio of the air-fuel mixture is made rich. Subsequently, at step 232, the amount of release NOXD of $NO_x$ released from the $NO_x$ absorbent 18 per unit time is calculated on the basis of the following equation:

$$NOXD = f_1 \cdot (K-1.0) \cdot TP \cdot N$$

Subsequently, at step 233, the amount of release $XNO_x$ of $NO_x$ actually released from the $NO_x$ absorbent 18 is calculated on the basis of the following equation. Note that, in the following equation, $\Delta t$ represents the interval of the time interruption.

$$XNO_x = XNO_x + NOXD \cdot \Delta t$$

Figure 19A:
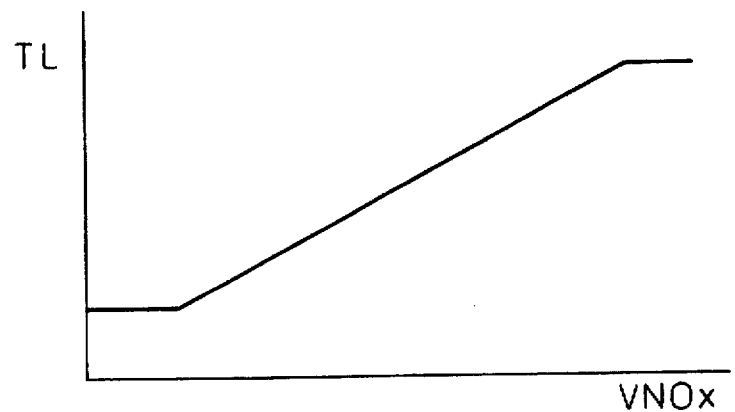
FIGS. 19A and 19B are views of a cycle TL for making the air-fuel ratio of the air-fuel mixture rich for releasing $NO_x$ and the rich time TR.
Figure 19B:
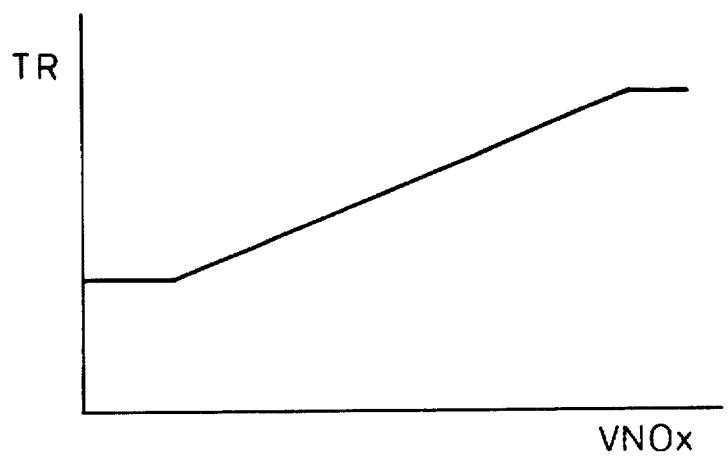

Subsequently, at step 234, it is determined whether or not a rich time TR shown in FIG. 19B in accordance with the maximum amount of absorption of $NO_x$ $VNO_x$ elapses from when the processing for release of $NO_x$ is started. When the rich time TR is elapsed, the processing routine proceeds to step 235, at which it is determined whether or not absolute value $|XNO_x - \Sigma NKX|$ of the difference between the actual amount of release of $NO_x$ $XNO_x$ and the corrected estimated amount of absorption of $NO_x$ $\Sigma NKX$ is larger than the constant value $\beta$. When $|XNO_x - \Sigma NKX| \leq \beta$, the processing routine jumps to step 237. Contrary to this, when $|XNO_x - \Sigma NKX| > \beta$, the processing routine proceeds to step 236, at which the correction value KX is corrected based on the following equation:

$$KX = KX \cdot XNO_x / \Sigma NKX$$

Subsequently, at step 237, the $NO_x$ releasing flag is reset, and thus the air-fuel ratio of the air-fuel mixture is changed from rich to the air-fuel ratio determined according to the operating state at that time, usually lean. Subsequently, at step 238, TC, $XNO_x$, and $\Sigma NOX$ are made zero.

Next, an explanation will be made of the decision of deterioration carried out at step 226 of FIG. 20 referring to FIG. 23.

Referring to FIG. 23, first of all, at step 240, the correction coefficient K is made the constant value KK of for example about 1.3. Subsequently, at step 241, the fuel injection time TAU is calculated on the basis of the following equation:

$$TAU = TP \cdot K$$

Accordingly, when the decision of deterioration is started, the feedback control of the air-fuel ratio is stopped, and the air-fuel ratio of the air-fuel mixture is made rich. Subsequently, at step 242, the amount of release NOXD of $NO_x$ released from the $NO_x$ absorbent 18 per unit time is calculated on the basis of the following equation:

$$NOXD = f \cdot (K-1.0) \cdot TP \cdot N$$

Subsequently, at step 243, the amount of release $VNO_x$ of $NO_x$ actually released from the $NO_x$ absorbent 18 is calculated on the basis of the following equation. Note that, in the following equation, $\Delta t$ represents the interval of the time interruption.

$$VNO_x = VNO_x + NOXD \cdot \Delta t$$

Subsequently, at step 244, it is determined whether or not the current value I of the $O_2$ sensor 22 becomes lower than the predetermined constant value $\alpha$ (FIG. 11). When I becomes smaller than $\alpha$, the processing routine proceeds to step 245, at which by multiplying a constant value larger than 1.0, for example, 1.1, with $VNO_x$, the decision level SAT ($=1.1 \cdot VNO_x$) is calculated. In this case, as mentioned before, $VNO_x$ represents the maximum amount of absorption of $NO_x$, that is, the degree of deterioration of the $NO_x$ absorbent 18. Subsequently, at step 246, on the basis of the maximum amount of absorption of $NO_x$, $VNO_x$, a cycle TL making the air-fuel ratio of the air-fuel mixture rich is calculated from the relationship shown in FIG. 19A, and then at step 247, the rich time TR of the air-fuel mixture is calculated from the relationship shown in FIG. 19B on the basis of the maximum amount of absorption of $NO_x$, $VNO_x$.

Subsequently, at step 248, it is determined whether or not the maximum amount of absorption of $NO_x$, $VNO_x$ becomes lower than the predetermined minimum value MIN. When $VNO_x$ becomes smaller than MIN, the processing routine proceeds to step 249, at which the alarm lamp 25 is turned on. Subsequently, at step 250, the decision of deterioration flag is reset. When the decision of deterioration flag is reset, the air-fuel ratio of the air-fuel mixture is changed to the air-fuel ratio in accordance with the operating state at that time, usually lean. Subsequently, at step 251, the $VNO_x$ and $\Sigma NOX$ are made zero.

As mentioned above, according to the present invention, by making the cycle for making the air-fuel ratio rich for releasing the $NO_x$ from the $NO_x$ absorbent or the rich time at that time shorter along with the deterioration of the $NO_x$ absorbent, it becomes possible to not only reduce the ratio of fuel consumption, but also to prevent the release of a large amount of unburnt hydrocarbons, CO, and $NO_x$ into the atmosphere at the time of the release of the $NO_x$.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purification device of an engine having an exhaust passage, comprising:

an $NO_x$ absorbent arranged in the exhaust passage, said $NO_x$ absorbent absorbing $NO_x$ therein when an air-fuel ratio of exhaust gas flowing into the $NO_x$ absorbent is lean and releasing absorbed $NO_x$ therefrom when the air-fuel ratio of the exhaust gas flowing into the $NO_x$ absorbent becomes rich;

air-fuel ratio control means for controlling the air-fuel ratio of the exhaust gas flowing into the $NO_x$ absorbent to temporarily change the air-fuel ratio of the exhaust gas flowing into the $NO_x$ absorbent from lean to rich at certain time intervals to release $NO_x$ from the $NO_x$ absorbent;

deterioration detecting means for detecting a degree of deterioration of the $NO_x$ absorbent; and $NO_x$ releasing control means for controlling at least one of a period at which the air-fuel ratio of exhaust gas flowing into the $NO_x$ absorbent is changed from lean to rich and a rich time during which the air-fuel ratio of exhaust gas flowing into the $NO_x$ absorbent is made rich to make one of said period and said rich time shorter as the degree of deterioration of the $NO_x$ absorbent becomes higher.

2. An exhaust purification device as set forth in claim 1, wherein the $NO_x$ absorbent contains at least one component selected from alkali metals consisting of potassium, sodium, lithium, and cesium, alkali earth metals consisting of barium and calcium, and rare earth metals consisting of lanthanum and yttrium and platinum.

3. An exhaust purification device as set forth in claim 1, wherein said air-fuel ratio control means temporarily changes the air-fuel ratio of the exhaust gas flowing into the $NO_x$ absorbent from lean to rich when the amount of $NO_x$ absorbed in the $NO_x$ absorbent exceeds a set value larger than the maximum amount of absorption of $NO_x$ of the $NO_x$ absorbent and said deterioration detecting means is provided with air-fuel ratio detecting means disposed in the exhaust passage downstream of the $NO_x$ absorbent for generating an output signal indicating the air-fuel ratio of the exhaust gas flowing out from the $NO_x$ absorbent and $NO_x$ amount calculating means for calculating the entire amount of $NO_x$ stored in the $NO_x$ absorbent based on the output signal of the air-fuel ratio detecting means when the air-fuel ratio of the exhaust gas flowing into the $NO_x$ absorbent is changed from lean to rich by said air-fuel ratio control means and said $NO_x$ releasing control means shortens at least one of said cycle and said rich time along with the reduction of the entire amount of $NO_x$ calculated by said $NO_x$ amount calculating means.

4. An exhaust purification device as set forth in claim 3, wherein the entire amount of $NO_x$ calculated by said $NO_x$ amount calculating means indicates the maximum amount of absorption of $NO_x$ of the $NO_x$ absorbent and said set value is made larger by a predetermined rate from said maximum amount of absorption of $NO_x$.

5. An exhaust purification device as set forth in claim 1, wherein said air-fuel ratio control means is comprised of first air-fuel ratio control means for changing the air-fuel ratio of the exhaust gas flowing into the $NO_x$ absorbent temporarily from lean to rich at said cycle controlled by said $NO_x$ releasing control means so as to cause the release of $NO_x$ from the $NO_x$ absorbent and second air-fuel ratio control means for changing the air-fuel ratio of the exhaust gas flowing into the $NO_x$ absorbent temporarily from lean to rich so as to cause the $NO_x$ to be released from the $NO_x$ absorbent and to detect the degree of deterioration of the $NO_x$ absorbent by said deterioration degree detecting means.

6. An exhaust purification device as set forth in claim 5, wherein said second air-fuel ratio control means temporarily changes the air-fuel ratio of the exhaust gas flowing into the $NO_x$ absorbent from lean to rich when the amount of $NO_x$ absorbed in the $NO_x$ absorbent exceeds a set value larger than the maximum amount of absorption of $NO_x$ of the $NO_x$ absorbent and said deterioration detecting means is provided with air-fuel ratio detecting means disposed in the exhaust passage downstream of the $NO_x$ absorbent for generating an output signal indicating the air-fuel ratio of the exhaust gas flowing out from the $NO_x$ absorbent and $NO_x$ amount calculating means for calculating an entire amount of $NO_x$ stored in the $NO_x$ absorbent based on the output signal of the air-fuel ratio detecting means when the air-fuel ratio of the exhaust gas flowing into the $NO_x$ absorbent is changed from lean to rich by said second air-fuel ratio control means, wherein the entire amount of $NO_x$ calculated by said $NO_x$ amount calculating means indicates the maximum amount of absorption of $NO_x$ of the $NO_x$ absorbent, and said $NO_x$ releasing control means shortens said cycle along with the reduction of the entire amount of $NO_x$ calculated by said $NO_x$ amount calculating means.

7. An exhaust purification device according to claim 6, wherein said $NO_x$ releasing control means shortens the rich time along with the reduction of the entire amount of $NO_x$ calculated by said $NO_x$ amount calculating means.

8. An exhaust purification device as set forth in claim 6, wherein said air-fuel ratio detecting means generates an output signal indicating that the air-fuel ratio is slightly lean during a period for which the $NO_x$ is released from the $NO_x$ absorbent after the air-fuel ratio of the exhaust gas flowing into the $NO_x$ absorbent is changed from lean to rich and generates an output signal indicating that the air-fuel ratio is rich when the $NO_x$ releasing action from the $NO_x$ absorbent is completed.

9. An exhaust purification device as set forth in claim 8, wherein said air-fuel ratio detecting means comprises an air-fuel ratio detection sensor which increases its output current proportional to the increase of the air-fuel ratio.

10. An exhaust purification device as set forth in claim 8, wherein said $NO_x$ amount calculating means decreases the $NO_x$ storage amount in accordance with the $NO_x$ releasing amount determined according to the engine operating state during a period from when the air-fuel ratio of the exhaust gas flowing into the $NO_x$ absorbent is changed from lean to rich to when said air-fuel ratio detecting means generates the output signal indicating that the air-fuel ratio is rich, and thereby said entire amount of $NO_x$ stored in the $NO_x$ absorbent is calculated.

11. An exhaust purification device as set forth in claim 10, wherein said $NO_x$ releasing amount determined according to the engine operating state is proportional to the excess fuel amount.

12. An exhaust purification device as set forth in claim 6, wherein said set amount is made larger than said entire amount of $NO_x$ by exactly a predetermined proportion.

13. An exhaust purification device as set forth in claim 12, wherein said proportion is larger than 1.0 and smaller than 1.3.

14. An exhaust purification device as set forth in claim 6, wherein when said entire amount of $NO_x$ becomes smaller than the set amount, said deterioration detecting means decides that the $NO_x$ absorbent is deteriorated.

15. An exhaust purification device according to claim 6, wherein estimating means is provided for estimating an amount of $NO_x$ absorbed in the $NO_x$ absorbent to obtain an estimated amount of the $NO_x$ stored in the $NO_x$ absorbent and correction value calculating means is provided for calculating a correction value for said estimated amount of $NO_x$, which correction value is a value by which said estimated amount of $NO_x$ corrected by said correction value when the air-fuel ratio of exhaust gas flowing into the $NO_x$ absorbent is changed from lean to rich to release the $NO_x$ from the $NO_x$ absorbent indicates said entire amount of $NO_x$ calculated by said $NO_x$ amount calculating means, said second air-fuel ratio control means temporarily changing the air-fuel ratio of exhaust gas flowing into the $NO_x$ absorbent from lean to rich when said estimated amount of $NO_x$ corrected by said correction value exceeds said set value.

16. An exhaust purification device as set forth in claim 15, wherein said estimating means finds the estimated amount of the $NO_x$ by increasing the amount of storage of $NO_x$ in accordance with the amount of absorption of $NO_x$ determined by the engine operating state when the air-fuel ratio of the exhaust gas flowing into the $NO_x$ absorbent is lean and decreasing the amount of storage of $NO_x$ in accordance with the amount of release of $NO_x$ determined by the engine operating state when the air-fuel ratio of the exhaust gas flowing into the $NO_x$ absorbent is rich.

17. An exhaust purification device as set forth in claim 16, wherein said amount of absorption of $NO_x$ determined according to the engine operating state is a function of the engine speed and the engine load.

18. An exhaust purification device as set forth in claim 16, wherein said $NO_x$ releasing amount determined according to the engine operating state is proportional to the excess fuel amount.

19. An exhaust purification device as set forth in claim 15, wherein when defining the estimated amount of $NO_x$ estimated by said air-fuel ratio control means as $\Sigma NOX$ and defining the correction value calculated by said correction value calculating means as $KX$, the estimated amount of $NO_x$ $\Sigma NKX$ corrected by said correction value is represented by the following equation:

$$\Sigma NKX = KX \cdot \Sigma NOX.$$

20. An exhaust purification device as set forth in claim 19, wherein when defining said entire amount of $NO_x$ calculated by said $NO_x$ amount calculating means as $XNO_x$, said correction value $KX$ is updated on the basis of the following equation:

$$KX = KX \cdot XNO_x / \Sigma NKX.$$

21. An exhaust purification device as set forth in claim 20, wherein when the difference between the estimated amount of $NO_x$ $\Sigma NKX$ corrected by said correction value and said entire amount of $NO_x$ $XNO_x$ is larger than a predetermined value, said correction value $KX$ is updated.

22. An exhaust purification device as set forth in claim 5, wherein when the $NO_x$ is to be released from the $NO_x$ absorbent, the air-fuel ratio of the exhaust gas flowing into the $NO_x$ absorbent is made rich for exactly the rich time controlled by said $NO_x$ releasing control means.

23. An exhaust purification device as set forth in claim 5, wherein the frequency of the air-fuel ratio of the exhaust gas being changed from lean to rich by the second air-fuel ratio control means is lower than the frequency of the air-fuel ratio of the exhaust gas being changed from lean to rich by said first air-fuel ratio control means.

* * * * *

UNITED STATES PATENT AND TRADEMARK OFFICE
CERTIFICATE OF CORRECTION

PATENT NO. : 5,735,119
DATED : April 7, 1998
INVENTOR(S) : Takamitsu ASANUMA, et al.

It is certified that error appears in the above-identified patent and that said Letters Patent is hereby corrected as shown below:

Column 3, line 15, change "37 all" to --37--all--.

Column 4, line 46, change "$NO_n$" to --$NO_x$--.

Column 9, line 16, change " NOX" to -- NOX--.

Column 9, line 47, change "releasting" to --releasing--.

Column 11, line 63, delete second "at".

Column 14, line 10, change "or" to --of--.

Column 15, line 28, delete first "FIG.".

Column 18, line 60, change "$NO_x$releasing" to --$NO_x$ releasing--.

Column 18, line 66, change "$NO_x$absorbent" to --$NO_x$ absorbent--.

Column 20, line 27, change "$NO_x$releasing" to --$NO_x$ releasing--.

UNITED STATES PATENT AND TRADEMARK OFFICE
CERTIFICATE OF CORRECTION

PATENT NO. : 5,735,119
DATED : April 7, 1998
INVENTOR(S) : Takamitsu ASANUMA, et al.

It is certified that error appears in the above-identified patent and that said Letters Patent is hereby corrected as shown below:

Column 21, line 4, change "$NO_x$releasing" to --$NO_x$ releasing--.

Column 21, line 12, change "$NO_x \Sigma NKX$" should read --$NO_x \Sigma NKX$--

Signed and Sealed this

Sixteenth Day of February, 1999

Attest:

Attesting Officer

Acting Commissioner of Patents and Trademarks